United States Patent
Hunt

(10) Patent No.: US 6,546,553 B1
(45) Date of Patent: Apr. 8, 2003

(54) SERVICE INSTALLATION ON A BASE FUNCTION AND PROVISION OF A PASS FUNCTION WITH A SERVICE-FREE BASE FUNCTION SEMANTIC

(75) Inventor: Galen C. Hunt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/349,732

(22) Filed: Jul. 8, 1999

Related U.S. Application Data

(63) Continuation-in-part of application No. 09/197,246, filed on Nov. 20, 1998, and a continuation-in-part of application No. 09/196,836, filed on Nov. 20, 1998, and a continuation-in-part of application No. 09/196,974, filed on Nov. 20, 1998.
(60) Provisional application No. 60/102,815, filed on Oct. 2, 1998.

(51) Int. Cl.⁷ .............................................. G06F 9/445
(52) U.S. Cl. ...................... 717/174; 717/163; 717/175; 717/176; 717/177; 712/233; 712/234; 712/244; 714/38
(58) Field of Search ................... 717/174, 177, 717/162, 163, 175, 176, 178, 111, 130; 712/233, 234, 244; 714/38

(56) References Cited

U.S. PATENT DOCUMENTS

| | | | |
|---|---|---|---|
| 3,427,443 A | 2/1969 | Apple et al. | 714/38 |
| 3,551,659 A | 12/1970 | Forsythe | 714/38 |
| 4,819,233 A | 4/1989 | Delucia et al. | 717/129 |
| 5,193,180 A | 3/1993 | Hastings | 717/163 |
| 5,247,678 A | 9/1993 | Littleton | 709/331 |
| 5,535,329 A | 7/1996 | Hastings | 714/35 |
| 5,579,520 A | 11/1996 | Bennett | 717/151 |
| 5,675,805 A | 10/1997 | Boldo et al. | 717/114 |
| 5,752,038 A | 5/1998 | Blake et al. | 717/158 |

(List continued on next page.)

OTHER PUBLICATIONS

TITLE: User–oriented criteria for the selection of DSS software, Reimann et al, ACM, Feb. 1985.*

(List continued on next page.)

*Primary Examiner*—Gregory Morse
*Assistant Examiner*—Chameli C. Das
(74) *Attorney, Agent, or Firm*—Klarquist Sparkman, LLP

(57) ABSTRACT

A base function provides a base function semantic. During service installation, an unconditional branch instruction to a service function replaces one or more instructions at the beginning of a base function. The service function provides a service semantic such as instrumentation, redirection, replacement, or extension. After service installation, a pass function includes the replaced base function instructions and an unconditional branch instruction to the logically subsequent base function instruction. Thus, the pass function provides a service-free base function semantic. The service function calls the pass function an arbitrary number of times before and/or after executing any other service function instructions. The pass function is allocated statically or dynamically. A statically allocated pass function is callable before and/or after service installation to guarantee a service-free base function semantic. A service removal function restores a base function and conforms a pass function to the restored base function. A pass function is callable before and/or after service removal. A library of service installation functions includes functions for installing and removing a service on a base function. A library of binary editing functions includes functions for attaching service installation functions and associated data payloads to a binary file.

57 Claims, 9 Drawing Sheets

U.S. PATENT DOCUMENTS

| | | | | |
|---|---|---|---|---|
| 5,790,858 | A | | 8/1998 | Vogel ......................... 717/130 |
| 5,978,583 | A | | 11/1999 | Ekanadham et al. ........ 717/106 |
| 5,987,247 | A | | 11/1999 | Lau ............................ 709/201 |
| 6,011,918 | A | | 1/2000 | Cohen et al. ................ 717/106 |
| 6,026,484 | A | * | 2/2000 | Golston ....................... 712/226 |
| 6,044,224 | A | | 3/2000 | Radia et al. ................. 717/162 |
| 6,088,717 | A | | 7/2000 | Reed et al. .................. 713/156 |
| 6,112,304 | A | | 8/2000 | Clawson ..................... 713/156 |
| 6,134,559 | A | | 10/2000 | Brumme et al. ......... 707/103 R |
| 6,154,878 | A | * | 11/2000 | Saboff ......................... 717/173 |
| 6,385,766 | B1 | * | 5/2002 | Doran, Jr. et al. .......... 717/169 |
| 6,393,476 | B1 | * | 5/2002 | Barnhouse et al. ......... 709/223 |
| 6,397,254 | B1 | * | 5/2002 | Northrup .................... 709/227 |
| 6,421,705 | B1 | * | 7/2002 | Northrup .................... 709/203 |
| 6,445,782 | B1 | * | 9/2002 | Elfe et al. .............. 379/201.01 |

OTHER PUBLICATIONS

Lea et al., "COOL: system support for distributed object–oriented programming," pp. 1–18 (May 2, 1993).

Forin et al., "High–Performance Distributed Objects Over System Area Networks," *Proc. 3rd USENIX Windows NT Symp.*, 10 pp. (Jul. 1999).

Hunt et al., "A Guided Tour of the Coign Automatic Distributed Partitioning System," Proceedings of the Second Int'l Enterprise Distributed Object Computing Workshop (EDOC '98), pp. 252–262 (Nov. 1998).

Brown, K., "Building a Lightweight COM Interception Framework, Part I: The Universal Delegator," *Microsoft Systems Journal*, vol. 14, pp. 17–29 (Jan. 1999).

Brown, K., "Building a Lightweight COM Interception Framework, Part II: The Guts of the UD," *Microsoft Systems Journal*, vol. 14, pp. 49–59 (Feb. 1999).

Hunt et al., "Intercepting and Instrumenting COM Applications," Proceedings of the Fifth Conference on Object–Oriented Technologies and Systems (COOTS '99), pp. 45–56 (May 1999).

Hunt et al., "The Coign Automatic Distributed Partitioning System," Proceedings of the Third Symposium on Operating System Design and Implementation (OSDI '99), pp. 187–200 (Feb. 1999).

Vinoski, S., "CORBA: Integrating Diverse Applications Within Distributed Heterogeneous Environments," *IEEE Communications*, 14(2) (Feb. 1997).

Narasimhan et al., "Exploiting the Internet Inter–ORB Protocol Interface to Provide CORBA With Fault Tolerance," Proceedings of the Third USENIX Conference on Object–Oriented Technologies and Systems, 11pp. (Jun. 1997).

Schmidt et al., "Object Interconnections, Object Adapters: Concepts and Terminology (col. 11)," *SIGS C++ Report*, 9pp (Oct. 1997).

Wang et al., "COMERA: COM Extensible Remoting Architecture," Proceedings of the 4$^{th}$ USENIX Conference on Object–Oriented Technologies and Systems (COOTS '98), pp. 79–88 (Apr. 1998).

Kirtland, M., "Object–Oriented Software Development Made Simple With COM+ Runtime Services," *Microsoft Systems Journal*, vol. 12, pp. 49–59 (Nov. 1997).

Zielinski et al., "A Tool for Monitoring Software–Hetergeneous Distributed Object Applications," Proc. 15th Int'l Conf. on Distributed Computing Systems, Vancouver, Canada, IEEE CS Press, pp. 11–18 (May 1995).

Tamches et al., "Fine–Grained Dynamic Instrumentation of Commodity Operating System Kernels," Proceedings of the Third Symposium on Operating Systems Design and Implementation (OSDI '99), pp. 117–130 (Feb. 1999).

Stephen J. Hartley, "Compile–Time Program Restructuring in Multiprogrammed Virtual Memory Systems," *IEEE Transactions on Software Engineering*, vol. 14, No. 11 (Nov. 1988).

R.R. Heisch, "Trace–directed program restructuring for AIX executables," *IBM J. Res. Develop.*, vol. 38, No. 5 (Sep. 1994).

Karl Pettis and Robert C. Hansen, "Profile Guided Code Positioning," Proceedings of the ACM SIGPLAN'90, Conference on Programming Language, Design and Implementation, Jun. 20–22 (1990).

Chang et al., "Using Profile Information to Assist Classic Code Optimizations," *Software–Practice and Experience*, vol. 21(12), 1301–1321 (Dec. 1991).

Speer et al., "Improving UNIX Kernel Performance using Profile Based Optimization," 1994 Winter USENIX, Jan. 17–21, 1994, San Francisco, CA.

Thomas Ball and James R. Larus, "Optimally Profiling and Tracing Programs," *University of Wisconsin Computer Sciences Technical Report 1031* (Sep. 6, 1991).

James R. Larus and Thomas Ball, "Rewriting Executables Files to Measure Program Behavior," *University of Wisconsin Computer Sciences Technical Report 1083* (Mar. 25, 1992).

Vivek Sarkar, "Determining Average Program Execution Times and their Variance," ACM 0–89791–306/X/89/0006/0298 (1989).

Robert Endre Tarjan, "Data Structures and Network Algorithms," CBMS–NSF Regional Conference Series in Applied Mathematics, Chapter 6, 71–83 (1983).

Galen C. Hunt, "Using Inter–Component Communication Analysis to Understand Component Applications," Ph.D. Thesis Proposal, University of Rochester, Rochester, New York, 42 pp. (Jan. 1997).

Galen C. Hunt and Michael L. Scott, "Coign: Efficient Instrumentation for Inter–Component Communication Analysis," URCS Tech Report 648, University of Rochester, Rochester, NY, 11 pp. (Feb. 1997).

Galen C. Hunt, "Using Inter–Component Communication Analysis to Understand Component Applications," Slide Presentation at Six Month Review of Ph.D. Thesis Project, University of Rochester, Rochester, New York, 9 pp. (Apr. 1997).

Galen C. Hunt, "Inter–Component Communication Analysis: Dynamic Discovery and Placement of Components in Distributed Applications," Handout from Third Conference on Object–Oriented Technologies and Systems, 2 pp. (May 1997).

Galen C. Hunt, "Inter–Component Communication Analysis: Dynamic Discovery and Placement of Components in Distributed Applications," Slide Presentation at Third Conference on Object–Oriented Technologies and Systems, 7 pp. (May 1997).

Galen C. Hunt and Michael L. Scott, "Coign: Automated Distributed Partitioning of Component Applications," Abstract from SOSP Work–in–Progress session, 1 pp. (Oct. 1997).

Galen C. Hunt and Michael L. Scott, "Coign: Automated, Distributed Partitioning of Component Applications," Poster from SOSP Work–in–Progress session, 8 pp. (Oct. 1997).

Galen C. Hunt and Michael L. Scott, "Contributions," Poster from SOSP Work–in–Progress session, 3 pp. (Oct. 1997).

Galen C. Hunt and Michael L. Scott, "Coign: Automated Distributed Partitioning of Component Applications," Abstract from SOSP Work–in–Progress session, 12 pp. (Oct. 1997).

Galen C. Hunt and Michael L. Scott, "Coign: Automated Distributed Partitioning of Component Applications," Slide Presentation from SOSP Work–in–Progress session, 4 pp. (Oct. 1997).

Galen C. Hunt, "Creating Distributed Applications the Easy Way," Slide Presentation to ACM of Rochester, Rochester, New York, 44 pp. (Dec. 1997).

Galen C. Hunt, "Creating Distributed Applications the Easy Way," Handout at Presentation to ACM of Rochester, Rochester, New York, 1 pp. (Dec. 1997).

Galen C. Hunt, "Automatic Application Partitioning," Slide Presentation at 6 month Review of Ph.D. Thesis Project, University of Rochester, Rochester, New York, 17 pp. (Dec. 1997).

Galen C. Hunt, "Automatic Distributed Partitioning of Component Applications," Slide Presentation at 6 Month Review of Ph.D. Thesis Project, University of Rochester, Rochester, New York, 17 pp. (May 1998).

Aral, Ziya et al., "Efficient Debugging Primitives for Multiprocessors," ASPLOS–III Proceedings, Third International Conference on Architectural Support for Programming Languages and Operating Systems, Boston, Massachusetts, 87–95 (Apr. 1989).

Aral, Ziya et al, "Non–Intrusive and Interactive Profiling in Parasight," ACM/SIGPLAN PPEALS 1988, New Haven, Connecticut, 21–30 (Jul. 1988).

Osman, Eric, "DDT Reference Manual," Massachusetts Institute of Technology Artificial Intelligence Laboratory, Memo No. 147A, 81 pp. (Sep. 1971).

Evans, Thomas G., "On–Line Debugging Techniques: A Survey," AFIPS Conference Proceedings, vol. 29, Fall Joint Computer Conference, 37–50 (Nov. 1966).

Gill, S., "The Diagnosis of Mistakes in Programmes on the EDSAC," Proceedings of the Royal Society of London, Series A. Mathematical and Physical Sciences, vol. 206, London, England, 538–554 (May 1951).

Kessler, Peter B., "Fast Breakpoints: Design and Implementation," Proceedings of the ACM SIGPLAN'90 Conference on Programming Language Design and Implementation, White Plains, New York, 78–84 (Jun. 1990).

Keppel, David, "A Portable Interface for On–The–Fly Instruction Space Modification," University of Washington, Seattle, Washington, 86–94 (1991).

Larus, James R. et al., "EEL: Machine–Independent Executable Editing," SIGPLAN Conference on Programming Language Design and Implementation, 291–300 (Jun. 1995).

Romer, Ted et al., "Instrumentation and Optimization of Win32/Intel Executables Using Etch," Proceedings of the USENIX Windows NT Workshop 1997, Seattle, Washington, 1–7 (Aug. 1997).

Srivastava, Amitabh et al., "ATOM: A System for Building Customized Program Analysis Tools," Proceedings of the SIGPLAN '94 Conference on Programming Language Design and Implementation, Orlando, Florida, 196–205 (Jun. 1994).

Zhang, Xiaolan et al., "System Support for Automated Profiling and Optimization," Proceedings of the Sixteenth ACM Symposium on Operating System Principles, Saint-–Malo, France, 12 pp. (Oct. 1997).

Lee, Dennis et al., "Execution Characteristics of Desktop Applications on Windows NT," 25th Annual International Symposium on Computer Architecture, 12 pp. (Jun. 1998).

* cited by examiner

FIG. 1
Before service installation:
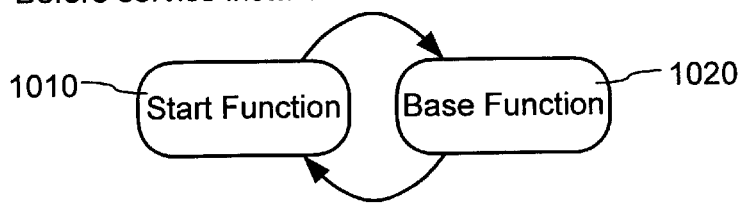
After service installation:
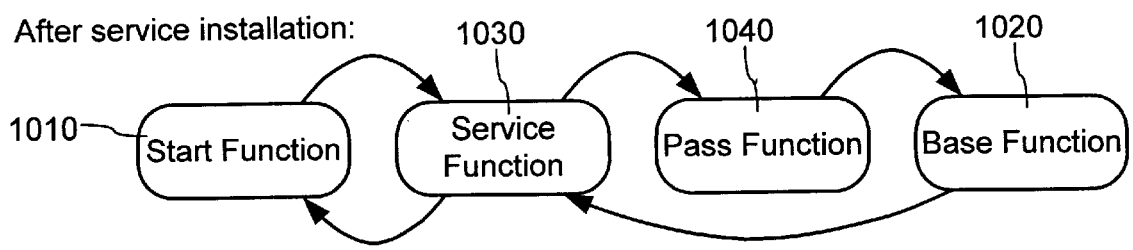
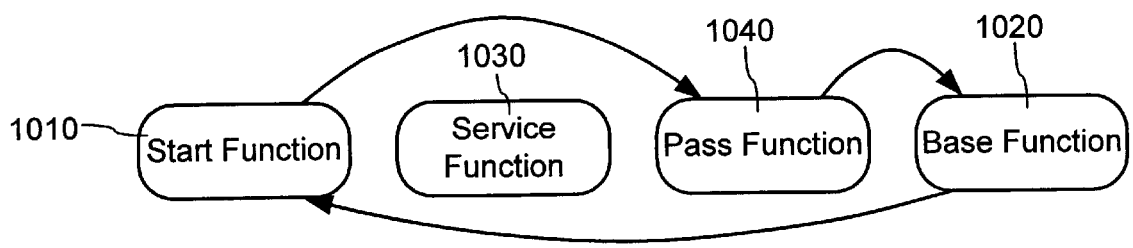
Before service installation
or after service removal:
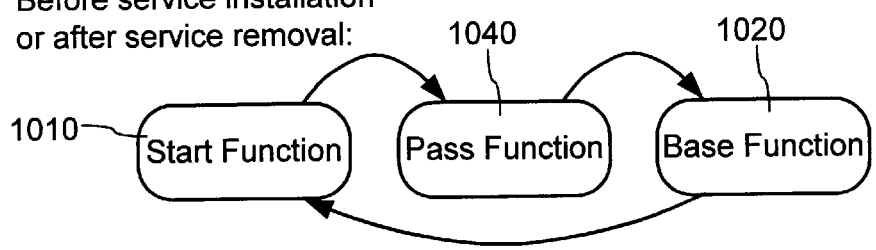

SERVICE INSTALLATION ON A BASE FUNCTION AND PROVISION OF A PASS FUNCTION WITH A SERVICE-FREE BASE FUNCTION SEMANTIC

RELATED APPLICATION DATA

This application claims the benefit of U.S. Provisional Application No. 60/102,815, filed Oct. 2, 1998, entitled "Automatic Partitioning and Distribution of Applications," the disclosure of which is incorporated by reference. This application is a continuation-in-part of U.S. patent application Ser. No. 09/197,246, filed Nov. 20, 1998, U.S. patent application Ser. No. 09/196,836, filed Nov. 20, 1998, and U.S. patent application Ser. No. 09/196,974, filed Nov. 20, 1998.

TECHNICAL FIELD

The present invention pertains to service installation by modifying a base function image to route a call of the base function to a service function. The service function adds a service semantic and can call a pass function. The pass function enables a service-free semantic for the base function.

BACKGROUND OF THE INVENTION

Complex software systems from applications to operating systems include thousands, even millions, of lines of code. Understanding these complex software systems presents a challenge to the original software developers as well as third party software developers and users. The ability to instrument and extend these software systems promotes efficient software development, effective software use, and innovative software research.

Original developers build, debug, and optimize a system. When building and testing a system, the original developers frequently install a service on the system for instrumenting the system. Instrumentation profiles the interaction of various components of the system, times the execution of components, or otherwise measures the system for revision or optimization. Instrumentation can help isolate problems during debugging. After a first generation, developers may extend a software system to include new functions. Still later, when a complex software system has undergone revisions, developers may face legacy problems, having to support earlier versions of the complex system while providing enhanced functionality in later versions.

After a complex software system ships, third party developers and users may not have access to source code for the system. Nevertheless, like the original developers, the third party developers and users may want to instrument the software system for profiling, timing, optimizing, or debugging. Moreover, third party developers and users frequently want a slightly different software system. In this situation, rather than create a whole system from scratch, third party developers and users may prefer to change or extend an existing software system. Given the complexity of such systems and the lack of access to source code, however, third party developers and users must work with a binary version.

Most current software systems use function calls between components. A function performs a task or operation called a semantic. A function call is a request to a component to perform the semantic for a function. A function call typically transfers execution to the called function while saving the necessary information to allow execution to resume at the calling point when the called function has completed execution. One effective way to instrument or extend software systems involves interception of function calls. Techniques for intercepting function calls include source code replacement, binary code replacement, dynamic link library redirection, dynamic link library replacement, breakpoint trapping of function calls, and inline redirection.

Source code replacement involves replacing function calls in source code with calls to, e.g., instrumentation functions. This requires access to source code, which renders it impracticable for many software systems. Binary code replacement entails replacing function calls in a binary of the software system with calls to, e.g., instrumentation functions. While this does not require source code access, it requires the ability to identify all applicable call sites. To facilitate identification of call sites, an application might be linked with substantial symbolic information.

When a software system uses load-time dynamic linking, DLL redirection involves modifying an import table in a binary file to reference an instrumentation library. DLL redirection fails to intercept dynamic function calls, however. DLL replacement involves replacing a DLL with an instrumented version. While this guarantees an instrumented semantic for the library, it penalizes use of the non-instrumented semantic for the library.

Breakpoint trapping involves insertion of breakpoints into an image after it has been loaded into memory space. When execution reaches a breakpoint, an exception is thrown and caught by the instrumentation system. While effective, breakpoint trapping has a very high performance cost.

Inline redirection involves intercepting function calls and rerouting them to instrumentation. Inline redirection is potentially effective and efficient, but the various existing implementations of inline redirection have numerous shortcomings.

Inline redirection falls into the family of techniques known as code patching. Code patching has been used both to instrument and to extend the functionality of software systems. To intercept execution, an unconditional branch, or jump, is inserted into the desired interception point in a base function. Code overwritten by the unconditional branch is moved to a code patch. The code patch includes a call to instrumentation code (or the instrumentation code itself), the moved instructions, and a jump to the first instruction in the base function following the unconditional jump. A code patch can be inserted at the beginning, middle, or end of a base function, but works in a relatively fixed manner—it executes then transfers execution to the base function. A code patch lacks flexibility when working with the semantic for the base function. For example, a code patch does not preserve the semantic for a base function as a sub-routine and does not facilitate invoking the semantic for the base function an arbitrary number of times. Moreover, integration of a code patch with a base function is potentially very complicated. The code patch must ensure consistency in the context (registers, stack pointer, etc.) of the base function before and after instrumentation. A code patch typically saves register values and a stack pointer using hardware specific functions. To simplify state management, code patches are typically only prepended to base functions.

Static binary rewriting tools take as input a software system binary and an instrumentation script. The instrumentation script passes over the software binary inserting code between instructions, basic blocks, or functions. The output of the script is a new, instrumented software binary. This instrumented binary is relatively static. Instrumentation cannot be conveniently applied to an image at any point in execution. Moreover, while static binary rewriters allow insertion of instrumentation around instructions, e.g., through free registry discovery, the task of maintaining state consistency becomes very complicated. Static binary rewriters can use a standard system utility to save and restore states. Like code patching techniques, however, static binary rewriters do not preserve the semantic for a base function as a sub-routine and do not facilitate invocation of the semantic for the base function an arbitrary number of times.

SUMMARY OF THE INVENTION

The present invention pertains to service installation for modifying a base function to introduce therein an additional service provided by a service function. A function semantic relates to the task or operation that the function performs. The base function provides a base function semantic and the service function provides a service function semantic, neither of which is specified by the present invention. A pass function bypasses any installed service as necessary to provide a service-free base function semantic. After installing a service on a base function, calling the base function provides a service-installed semantic for the base function. On the other hand, calling the pass function provides a service-free semantic for the base function.

Service installation according to the present invention creates little overhead, correctly intercepts both statically and dynamically bound invocations, and is flexible. Using techniques of the present invention, inline redirection of any function can be selectively enabled for each process individually at load time based on the needs of the instrumentation.

The present invention pertains to the base, service, and pass functions, a library of functions for attaching a service installation section to a binary file, a library of functions for installing and removing services, techniques for creating a pass function, service state management techniques that exploit a uniform calling convention, and various techniques for using a pass function, as well as various applications of the above techniques, functions, and library.

The instructions for a function in computer memory form a function image. According to one aspect of the present invention, computer memory stores data representing a base function image, a service function image, and a pass function image. The base function image comprises instructions that provide a base function semantic. The service function image comprises instructions that provide a service function semantic. Independent from service installation, the pass function image provides a service-free semantic for the base function.

The service function provides some instrumentation, redirection, or extension for the base function semantic. The service function can provide a layer for profiling parameters of base function calls, a layer for redirecting base function calls, a layer for timing execution of the base function, a layer for redirecting exceptions, or a layer for instrumenting or extending the base function in some other way. The service function typically includes at least one call to a pass function. A call to the pass function can occur before and/or after execution of any other instructions in the service function. Alternatively, the service function can conditionally bypass the pass function.

The pass function provides a service-free semantic for the base function with an unconditional branch to an instruction in the base function image. For example, before service installation, a pass function image includes an unconditional branch instruction to the beginning of the base function image. After service installation, in which an unconditional branch instruction replaces one or more instructions at the beginning of the base function image, the pass function image includes any replaced instructions and an unconditional branch to the instruction that logically follows the replaced instructions in the base function. The pass function can be allocated statically (prior to run time) or dynamically (at run time). In one embodiment of the present invention, the pass function is callable from a user module.

According to a second aspect of the present invention, a service installation system includes a library of functions for installing a service on a base function. The service installation system includes a construct function and an install function. The service installation system works on functions with fixed or variable length instructions.

The construct function includes instructions for creating a pass function. In one embodiment, the construct function is a macro used to statically allocate the pass function. To create a statically allocated pass function, the construct function accepts as parameters a pass function prototype (the name of the pass function) and the name of the base function. In an alternative embodiment, a statically allocated pass function is created by explicitly allocating an array of instructions for a pass function.

The install function includes instructions for replacing one or more instructions in the base function with an unconditional branch instruction to a service function. The install function also includes instructions for making a pass function include the replaced base function instructions followed by a jump to the logically subsequent instruction in the base function. Thus, the install function gives a base function a service-installed semantic and gives a pass function a service-free base function semantic. According to one embodiment, the install function makes a pass function conform to a service-installed base function by enumerating the instructions of the base function and copying the first one or more instructions to the pass function before installing the unconditional branch in the base function. In the pass function, an unconditional branch to the logically subsequent base function instruction follows the last copied instruction.

When instructions come from a fixed length instruction set, the first instruction of the pass function becomes the first instruction of the original base function. The unconditional branch instruction in the pass function transfers control to the second instruction in the modified base function (whose first instruction is an unconditional branch to the service function). On the other hand, when instructions come from a variable length instruction set, the install function determines the size of the unconditional branch instruction to the service function. One or more instructions from the beginning of the base function, including instructions that will be overwritten by the unconditional branch instruction to the service function, are copied to the pass function. The unconditional branch instruction to the base function from the pass function transfers control to the instruction following the last copied instruction of the base function.

When a pass function created by the construct function is available, the install function accepts as parameters references to the pass function and the service function. In another embodiment, the install function takes references to the base function and the service function and returns a reference to a dynamically allocated pass function. In addition to the construct and install functions, the service software library can include functions for locating references to base functions and removing service installations.

According to a third aspect of the present invention, to attach a service software library to a software system, an application binary for the software system is modified to include a service installation section. An import table in the service installation section references the service software library. At link time, the functions of the service software library are made available to the software system. In addition to the construct and install functions, the service software library can include functions for editing an import table or attaching and removing data payloads to a service installation section.

A fourth aspect of the present invention concerns statically allocated pass functions. Using a link symbol for a base function, a statically allocated pass function can be created to guarantee a service-free semantic for the base function. Given a pass function prototype and the name of a base function, a macro statically allocates a pass function. In an alternative embodiment, a statically allocated pass function is created by explicitly allocating an array of instructions for a pass function. The statically allocated pass function initially includes an unconditional branch instruction to the beginning of the base function. The statically allocated pass function can be called from a service function and/or a user module. While the instructions of the statically allocated pass function change when service installation occurs, a statically allocated pass function is callable by a user module to provide a service-free base function semantic before and/or after service installation. Similarly, a statically allocated pass function is callable to provide a service-free base function semantic before and/or after service removal.

A fifth aspect of the present invention concerns dynamically allocated pass functions. A dynamically allocated pass function is created at run time during service installation on a base function. As an install function installs a service, the install function dynamically allocates a pass function to provide a service-free base function semantic. The install function takes as parameters, for example, references to a base function and a service function. The install function returns a reference to the dynamically allocated pass function. Where necessary, a pointer locating function finds a reference to the base function.

A sixth aspect of the present invention concerns using a standard calling convention to maintain state (e.g., register values, stack pointer, etc.) consistency for a service system. A base function, pass function, and service function have the same call signature. A start function calls a service-installed base function. The call pushes a call frame on the call stack. The base function transfers execution to a service function without pushing a new call frame. The service function calls a pass function at least one time before and/or after executing other instructions. On a call to the pass function, a new call frame is pushed on the call stack. The pass function transfers execution to the base function. When the base function completes execution, the call frame from the call to the pass function pops from the call stack. Later, when the service function completes execution, the call frame from the original call to the base function pops from the call stack. In this way, the service uses the standard calling convention to maintain state consistency without the need for complex register-usage analysis common to existing binary rewriters.

A seventh aspect of the present invention concerns calling the pass function as a sub-routine to provide a service-free base function semantic. For example, a service function typically makes at least one call to the pass function before and/or after executing any other instructions. The pass function provides a service-free base function semantic as a sub-routine of the service function. Alternatively, the service function conditionally bypasses the pass function.

The foregoing and other features and advantages of an illustrative embodiment of the present invention will be more readily apparent from the following detailed description, which proceeds with reference to the accompanying drawings.

BRIEF DESCRIPTION OF THE DRAWINGS

FIG. 1 is a flowchart showing the logical flow of execution between a start function, base function, service function, and pass function at various stages of service installation.

DETAILED DESCRIPTION OF AN ILLUSTRATED EMBODIMENT

Figure 2:
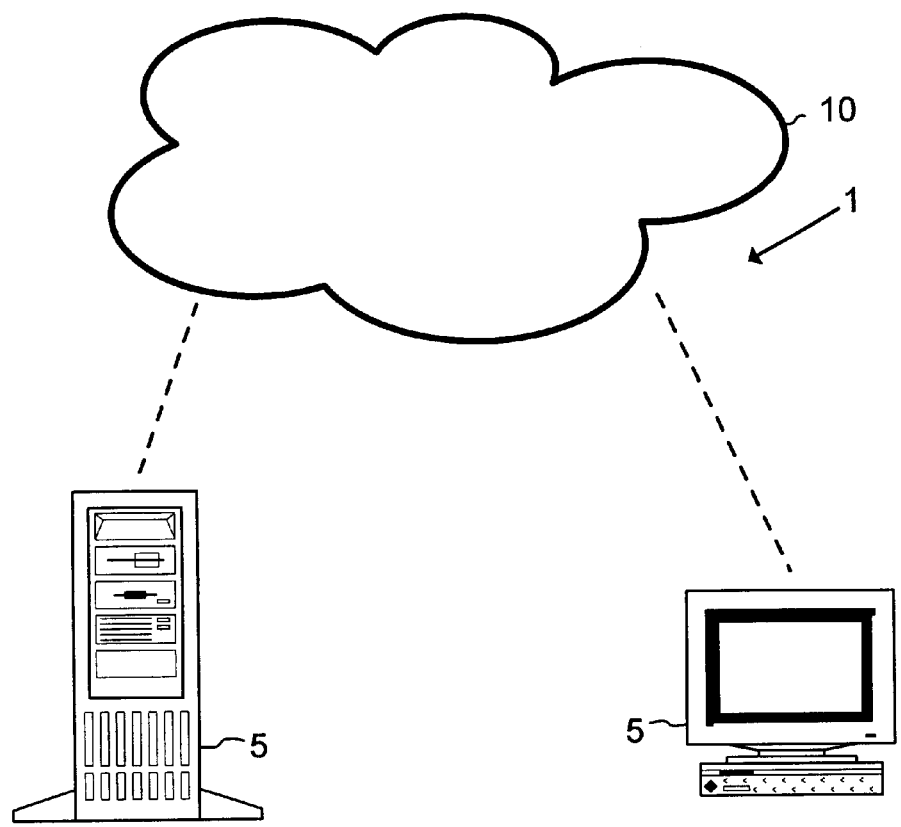
FIG. 2 is a diagram of a distributed computing environment in which the present invention can be implemented.

The present invention is directed to service installation for a base function with a service function. A pass function provides the original, service-free semantic for the base function, bypassing the service function as necessary. After service installation, calling the base function provides a service-installed base function semantic. Calling the pass function provides a service-free base function semantic.

FIG. 1 shows the logical flow of execution between a start function, a base function, a service function, and a pass function at various stages of service installation. Before service installation, a start function 1010, such as one in an application program, operating system, or other software system, calls a base function 1020. The base function 1020 executes then returns to the start function 1010.

After service installation, when the start function 1010 calls the base function 1020, execution transfers to the service function 1030. The service function 1030 executes any number of instructions before and/or after calling a pass function 1040. The pass function 1040 provides a service-free semantic for the base function 1020. Specifically, the pass function 1040 executes any base function 1020 instructions that were overwritten by an unconditional branch to the service function 1030. The pass function 1040 then transfers execution to the logically subsequent instruction in the base function 1020. The base function 1020 executes and returns to the service function 1030. On return to the service function 1030, the service function 1030 can call the pass function again to use the pass function 1040 as a sub-routine that provides a service-free base function 1020 semantic. Alternatively, the service function 1030 conditionally bypasses the pass function 1040, skipping the calls to the pass function. For example, a service function for testing a software system may periodically return an error code rather than call a pass function. After the service function 1030 completes execution, it returns to the start function 1010.

According to one embodiment of the present invention, after service installation, if the start function 1010 calls the pass function 1040, the start function 1010 bypasses the service function 1030 and invokes a service-free base function semantic. The pass function 1040 executes any overwritten instructions from the base function 1020 and transfers execution to the base function 1020. The base function 1020 executes and returns execution to the start function 1010.

According to another embodiment of the present invention, before service installation, the start function 1010 calls a statically allocated pass function that provides a service-free base function semantic. According to still another embodiment, the start function 1010 calls a pass function 1040 to provide a service-free base function semantic after service removal. While the base function 1020 provides a service-free semantic at these stages, calling the pass function 1040 guarantees a service-free semantic whether or not service is installed on the based function 1020.

The present invention includes a library of functions for installing and removing services on base functions, a library of functions for attaching a service installation section to a binary file, the interactions between base, service, and pass functions, techniques for creating pass functions, service state management techniques that exploit a uniform calling convention, and various techniques for using a pass function, as well as various applications of the above techniques, functions, and library.

In an illustrated embodiment of the present invention, a library of functions for installing services applies instrumentation to an object-oriented software system built according to the Component Object Model ["COM"] of Microsoft Corporation of Redmond, Wash. An Automatic Distributed Partitioning System ["ADPS"] supplies the specific service functions for instrumenting the COM software. In the illustrated embodiment, the library of service installation functions is the Detours library and the illustrated ADPS is the "COIGN" system. The Detours library also includes functions for attaching a type of service installation section called a detour section to an application binary file. The detour section includes a DLL import table and a data payload.

The COIGN system includes service functions that provide layers for instrumentation, redirection, or extension of COM software. The COIGN system treats base functions of COM software as target functions for service installation.

The COIGN system uses to Detours library to redirect a target function call to a type of service function called a detour function. The COIGN system creates a type of pass function called a trampoline function to bypass the detour function and provide an undetoured semantic for the target function where desired. Thus, in the COIGN system, the base, service, and pass functions are implemented as target, detour, and trampoline functions, respectively.

The Detours library includes a construct function in the form of a macro called DETOUR_MACRO. DETOUR_MACRO creates a statically allocated trampoline function. The Detours library also includes an install function for installing services provided in a detour function on a target function. For service installation using a statically allocated trampoline function, the Detours library includes the function DetourFunctionWithTrampoline. For service installation with a dynamically allocated trampoline function, the Detours library includes the function DetourFunction. The Detours library also includes functions DetourRemoveTrampoline for removing services and DetourFindFunction for finding target function pointers.

The COIGN system uses the Detours library to instrument component instantiation functions with a profiling layer. The profiling layer measures function parameters passed to and from the instantiated component in one or more profiling scenarios. The COIGN system then uses a profile of the COM software to calculate an efficient distribution scheme for distributed execution of the COM software. To enable distributed execution, the COIGN system uses the Detours library to instrument component instantiation functions with a distributing layer. The distributing layer distributes components through a distributed computing environment according to the distribution scheme.

Figure 3:
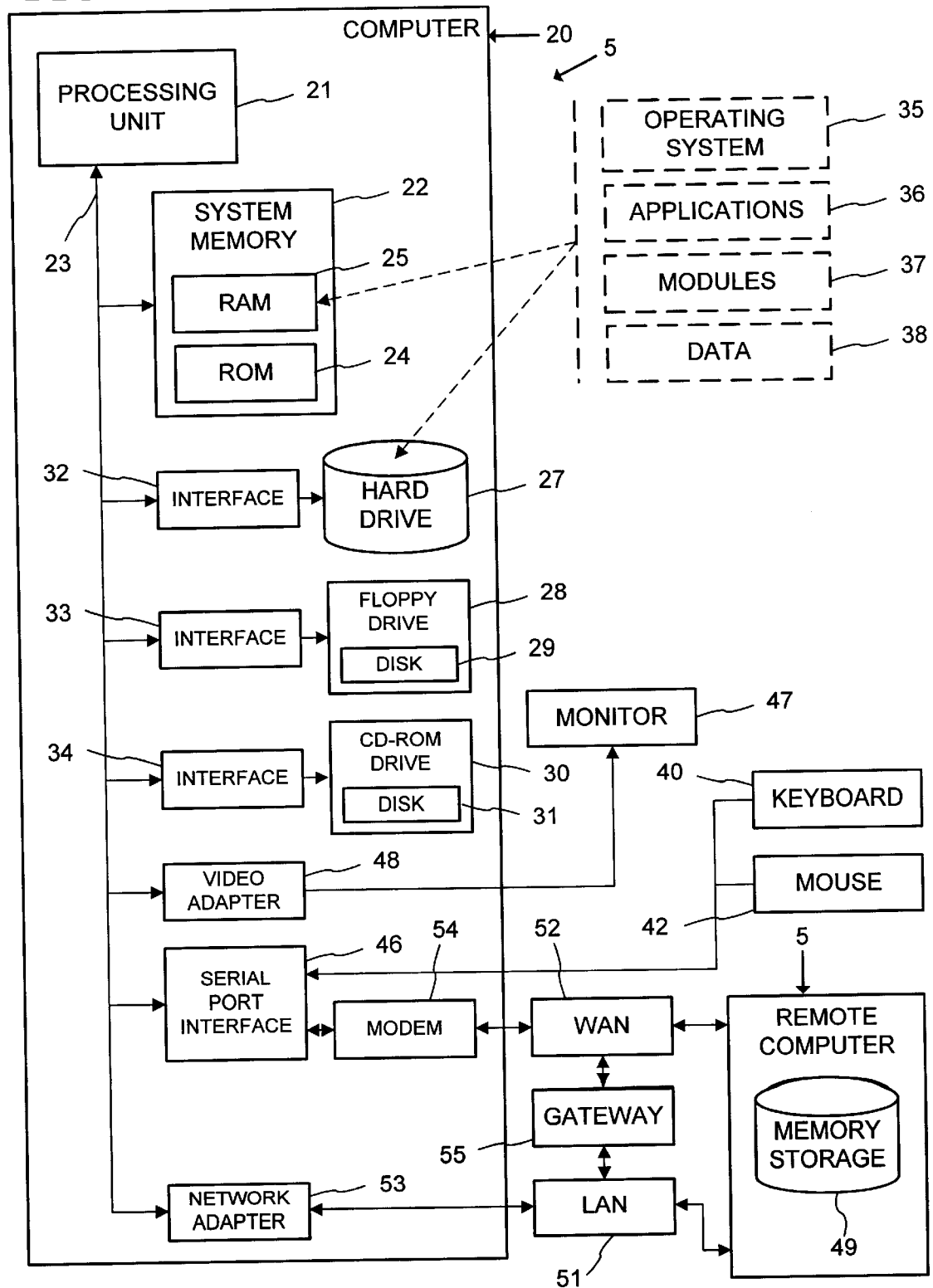
FIG. 3 is a block diagram of a computer system that can be used to implement the present invention.

FIGS. 2 and 3 and the following discussion are intended to provide a brief, general description of a suitable computing environment in which the illustrated ADPS using the Detours library can be implemented. While the present is described in the general context of computer-executable instructions that run on computers, those skilled in the art will recognize that the present invention can be implemented as a combination of program modules, or in combination with other program modules. Generally, program modules include routines, programs, components, data structures, etc. that perform particular tasks or implement particular abstract data types. The present invention can be implemented as a distributed application, one including program modules located on different computers in a distributed computing environment.

Exemplary Distributed Computing Environment

FIG. 2 illustrates a distributed computing environment 1 in which units of an application are profiled, partitioned and distributed by the illustrated ADPS using the Detours library in accordance with the present invention. The distributed computing environment 1 includes two computer systems 5 connected by a connection medium 10. The computer systems 5 can be any of several types of computer system configurations, including personal computers, hand-held devices, multiprocessor systems, microprocessor-based or programmable consumer electronics, minicomputers, mainframe computers, and the like. In terms of logical relation with other computer systems 5, a computer system 5 can be a client, a server, a router, a peer device, or other common network node. Moreover, although FIG. 2 illustrates two computer systems 5, the present invention is equally applicable to an arbitrary, larger number of computer systems connected by the connection medium 10. Further, the distributed computing environment 1 can contain an arbitrary number of additional computer systems 5 which do not directly involve the illustrated ADPS using the Detours library, connected by an arbitrary number of connection mediums 10. The connection medium 10 can comprise any local area network (LAN), wide area network (WAN), or other computer network, including but not limited to Ethernets, enterprise-wide computer networks, intranets and the Internet.

The illustrated ADPS using the Detours library automatically partitions an application and distributes program units by locating them in more than one computer system 5 in the distributed computing environment 1. Portions of the illustrated ADPS using the Detours library can be implemented in a single computer system 5, with the application later distributed to other computer systems 5 in the distributed computing environment 1. Portions of the illustrated ADPS using the Detours library can also be practiced in a distributed computing environment 1 where tasks are performed by a single computer system 5 acting as a remote processing device that is accessed through a communications network, with the distributed application later distributed to other computer systems 5 in the distributed computing environment 1. In a networked environment, program modules of the illustrated ADPS using the Detours library can be located on more than one computer system 5.

Exemplary Computer System

FIG. 3 illustrates an example of a computer system 5 that can serve as an operating environment for the illustrated ADPS using the Detours library. With reference to FIG. 3, an exemplary computer system for implementing the invention includes a computer 20 (such as a personal computer, laptop, palmtop, set-top, server, mainframe, and other varieties of computer), including a processing unit 21, a system memory 22, and a system bus 23 that couples various system components including the system memory to the processing unit 21. The processing unit can be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus can be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment.

A number of program modules can be stored in the drives and RAM 25, including an operating system 35, one or more application programs 36, other program modules 37, and program data 38.

A user can enter commands and information into the computer 20 through a keyboard 40 and pointing device, such as a mouse 42. Other input devices (not shown) can include a microphone, joystick, game pad, satellite dish, scanner, or the like. These and other input devices are often connected to the processing unit 21 through a serial port interface 46 that is coupled to the system bus, but can be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 can operate in a networked environment using logical connections to one or more other computer systems 5. The other computer systems 5 can be servers, routers, peer devices or other common network nodes, and typically include many or all of the elements described relative to the computer 20, although only a memory storage device 49 has been illustrated in FIG. 3. The logical connections depicted in FIG. 3 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications (e.g., via the LAN 51 and a gateway or proxy server 55) over the wide area network 52, such as the Internet. The modem 54, which can be internal or external, is connected to the system bus 23 via the serial port interface 46. In a networked environment, program modules depicted relative to the computer 20, or portions thereof, can be stored in the remote memory storage device. It will be appreciated that the network connections shown are exemplary and other means of establishing a communications link between the computer systems 5 (including an Ethernet card, ISDN terminal adapter, ADSL modem, 10BaseT adapter, 100BaseT adapter, ATM adapter, or the like) can be used.

In accordance with the practices of persons skilled in the art of computer programming, the illustrated ADPS using the Detours library is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Component Object Overview

Figure 4:
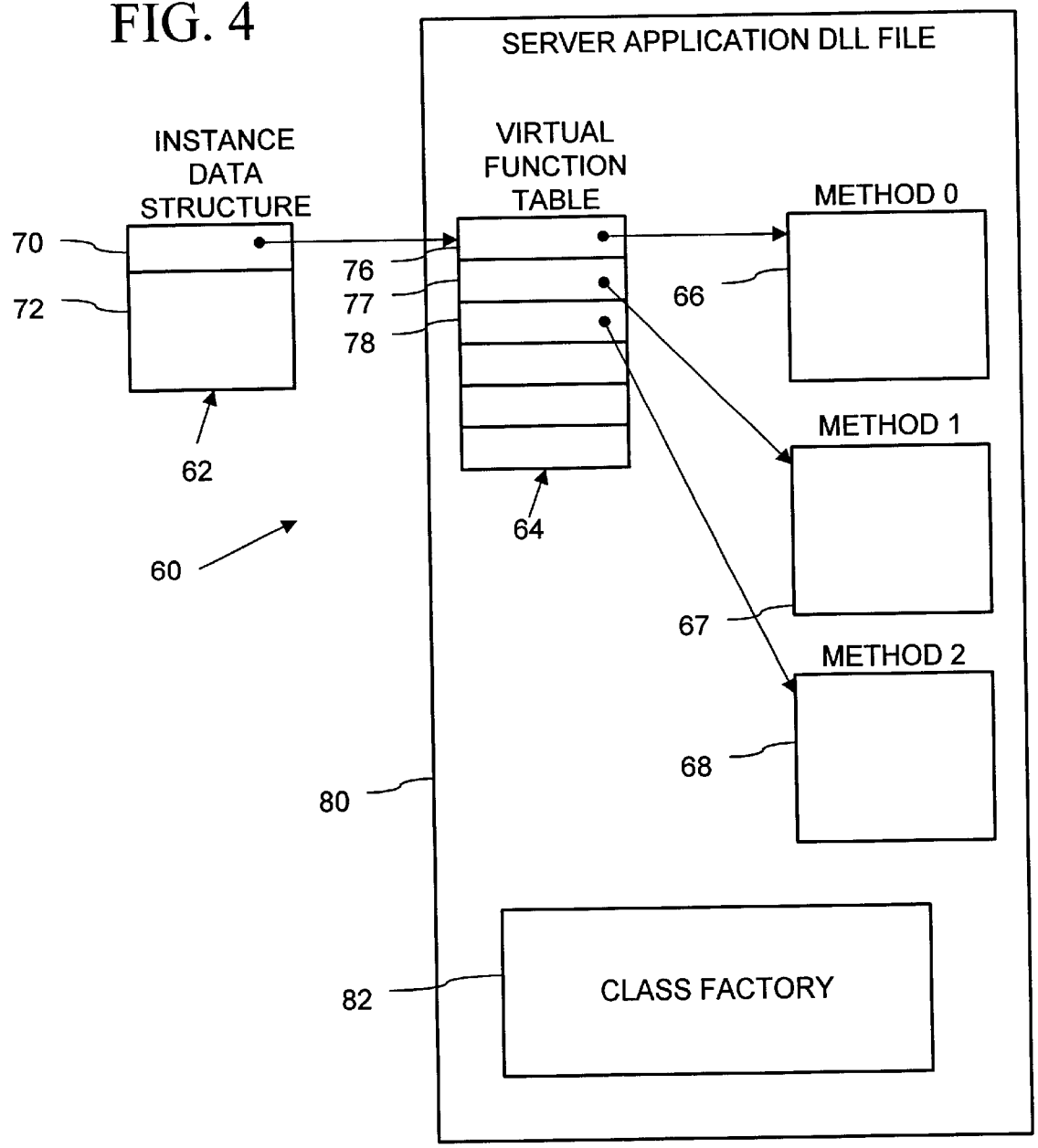
FIG. 4 is a block diagram of a Microsoft Component Object Model software component that can be used in an implementation of the present invention.

With reference now to FIG. 4, in the COIGN system, the computer 20 (FIG. 3) executes "COIGN," a component-based application that is developed as a package of component objects. COIGN's component objects conform to the Microsoft Component Object Model ("COM") specification (i.e., each is implemented as a "COM Object" 60, alternatively termed a "COM component"). COIGN executes using the COM family of services (COM, Distributed COM ("DCOM"), COM+) of the Microsoft Windows NT Server operating system, but alternatively can be implemented according to other object standards (including the CORBA (Common Object Request Broker Architecture) specification of the Object Management Group) and executed under object services of another operating system.

COIGN automatically partitions and distributes other component-based applications. Like COIGN, the component-based applications automatically partitioned and distributed by COIGN are implemented in conformity with COM and executed using COM services, but alternatively can be implemented according to another object standard and executed using object services of another operating system.

COM: Binary Compatibilty

The COM specification defines binary standards for objects and their interfaces which facilitate the integration of software components into applications. COM specifies a platform-standard binary mapping for interfaces, but does not specify implementations for interfaces. In other words, an interface is defined, but the implementation of the interface is left up to the developer. The binary format for a COM interface is similar to the common format of a C++ virtual function table. Referring to FIG. 4, in accordance with COM, the COM object 60 is represented in the computer system 20 (FIG. 3) by an instance data structure 62, a virtual function table 64, and member methods (also called member functions) 66–68. The instance data structure 62 contains a pointer 70 to the virtual function table 64 and data 72 (also referred to as data members, or properties of the object). A pointer is a data value that holds the address of an item in memory. The virtual function table 64 contains entries 76–78 for the member methods 66–68. Each of the entries 76–78 contains a reference to the code 66–68 that implements the corresponding member methods. A reference to an interface is stored as a pointer to the pointer 70.

While extremely simple, the binary mapping provides complete binary compatibility between COM components written in any language with any development tool. Any language that can call a function through a pointer can use COM components. Any language that can export a function pointer can create COM components. Language-neutral binary compatibility is an important feature of COM.

COM: Strongly Typed Interfaces and Interface Descriptor Language

The pointer 70, the virtual function table 64, and the member methods 66–68 implement an interface of the COM object 60. By convention, the interfaces of a COM object are illustrated graphically as a plug-in jack as shown in objects 110 and 130 in FIG. 5. Also, interfaces conventionally are given names beginning with a capital "I." In accordance with COM, the COM object 60 can include multiple interfaces, which are implemented with one or more virtual function tables. The member function of an interface is denoted as "IInterfaceName::MethodName."

All first-class communication in COM takes place through well-defined, binary-standard interfaces, which are strongly typed references to a collection of semantically related functions.

Programmatically, interfaces are described either with an Interface Definition Language (IDL) or with a package of compiled metadata structures called a type library. Whether expressed in IDL or a type library, the interface definition enumerates in detail the number and type of all arguments passed through interface functions. Each interface function can have any number of parameters. To clarify semantic features of the interface, IDL attributes can be attached to each interface, member function, or parameter. In IDL syntax, attributes are enclosed in square brackets ([]). Attributes specify features such as the data-flow direction of function arguments, the size of dynamic arrays, and the scope of pointers. Syntactically, IDL is very similar to C++. Moreover, the interface definition has a purpose similar to that of a function prototype in C++; it provides a description for invocation, but not an implementation. An IDL compiler maps the interface definitions into a standard format for languages such as C++, Java, or Visual Basic. For example, the Microsoft IDL compiler, MIDL, can map interfaces into C++ or export compiled IDL metadata to a type library. (For a detailed discussion of COM and OLE, see Kraig Brockschmidt, Inside OLE, Second Edition, Microsoft Press, Redmond, Wash. (1995)).

COM: Globally Unique Identifiers

In COM, classes of COM objects are uniquely associated with class identifiers ("LSIDs"), and registered by their CLSID in the registry. The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM service named "CoCreateGUID" (or any of several other APIs and utilities that are used to create universally unique identifiers) and assigns to the respective classes. The interfaces of a component are also immutably associated with interface identifiers ("IIDs"), which are also 128-bit GUIDs. If an interface changes, it receives a new IID.

COM: Implementation

The virtual function table 64 and member methods 66–68 of the COM object 60 are provided by an object server program 80 (hereafter "object server DLL") which is stored in the computer 20 (FIG. 3) as a dynamic link library file (denoted with a ".dll" file name extension). In accordance with COM, the object server DLL 80 includes code for the virtual function table 64 and member methods 66–68 of the classes that it supports, and also includes a class factory 82 that generates the instance data structure 62 for an object of the class.

Other objects and programs (referred to as a "client" of the COM object 60) access the functionality of the COM object by invoking the member methods through the COM object's interfaces. First, however, the COM object must be instantiated (i.e., by causing the class factory to create the instance data structure 62 of the object); and the client must obtain an interface pointer to the COM object.

Before the COM object 60 can be instantiated, the object is first installed on the computer 20. Typically, installation involves installing a group of related objects called a package. The COM object 60 is installed by storing the object server DLL file(s) 80 that provides the object in data storage accessible by the computer 20 (typically the hard drive 27, shown in FIG. 3), and registering COM attributes (e.g., class identifier, path and name of the object server DLL file 80, etc.) of the COM object in the system registry. The system registry is a per-machine component configuration database.

COM: Component Instantiation

A client requests instantiation of the COM object locally or on a remote computer using system-provided services and a set of standard, system-defined component interfaces based on class and interface identifiers assigned to the COM Object's class and interfaces. More specifically, the services are available to client programs as application programming interface (API) functions provided in the COM library, which is a component of the Microsoft Windows NT operating system in a file named "OLE32.DLL." The DCOM library, also a component of the Microsoft Windows NT operating system in "OLE32.DLL," provides services to instantiate COM objects remotely and to transparently support communication among COM objects on different computers.

In particular, the COM library provides "activation mechanism" API functions, such as "CoCreateInstance( )," that the client program can call to request local or remote creation of a component using its assigned CLSID and an IID of a desired interface. In response to a request, the "CoCreateInstanceo( )" API looks up the registry entry of the requested CLSID in the registry to identify the executable file for the class. The "CoCreateInstance( )" API function then loads the class' executable file either in the client program's process, or into a server process which can be either local or remote (i.e., on the same computer or on a remote computer in a distributed computer network) depending on the attributes registered for the COM object 60 in the system registry. The "CoCreateInstance( )" API uses the class factory in the executable file to create an instance of the COM object 60. Finally, the "CoCreateInstance( )" API function returns a pointer of the requested interface to the client program.

Figure 5:
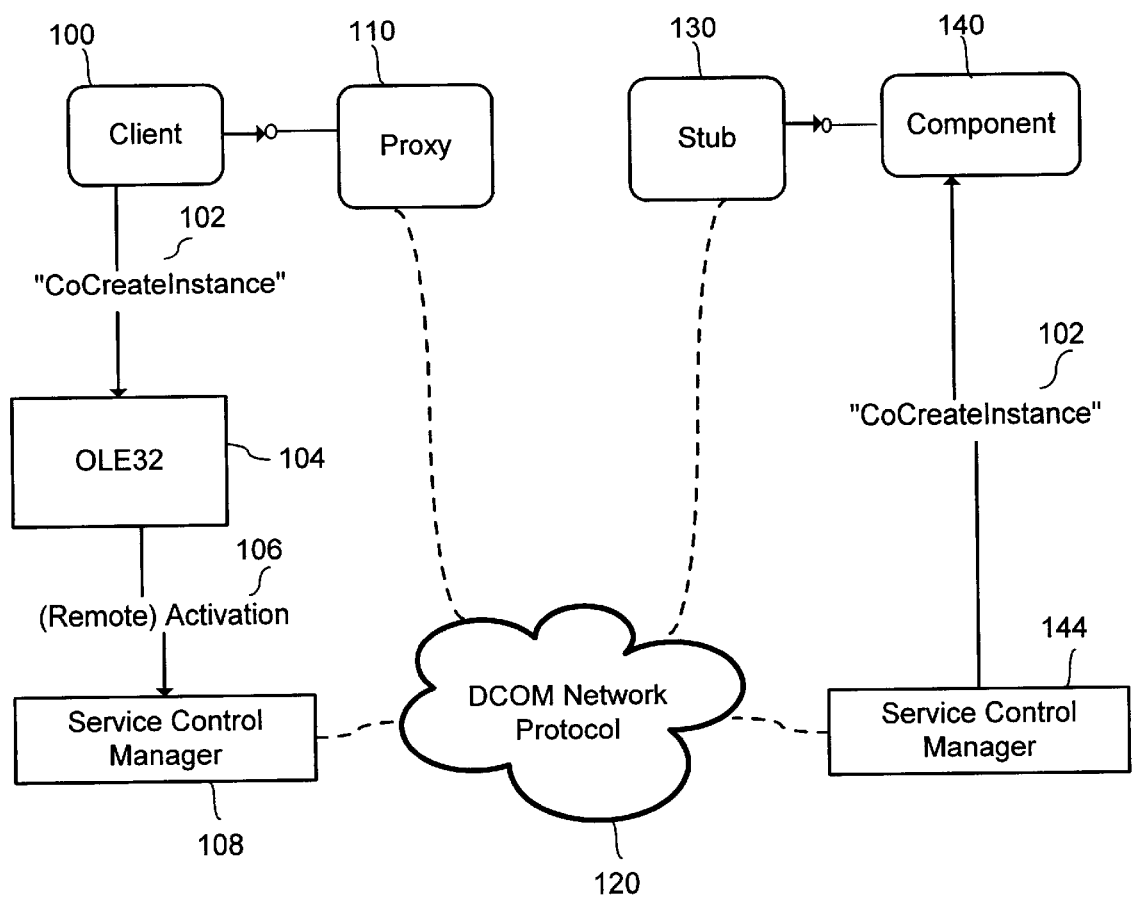
FIG. 5 is a block diagram of a client and the component of FIG. 4 in a distributed computing environment.

Referring to FIG. 5, a system including a local client 100 and a remote component 140 is described. A local client 100 instantiates and accesses the services of a remote component 140 using services provided by DCOM. DCOM provides the low-level services supporting instantiation of component 140 in another process or on another machine. After instantiation, DCOM supports cross-process or cross-machine communication.

More specifically, after the "CoCreateInstance" API 102 of the OLE32 DLL 104 is called by a client 100, the "CoCreateInstance" API 102 determines from the system registry, from an explicit parameter, or from a moniker, the class of the component 140 and in which machine or process the component 140 should be instantiated. In FIG. 5, the component 140 is to be activated 106 on a remote machine. A local Service Control Manager 108 connects to a remote Service Control Manager 144, which requests creation of the component 140 through the "CoCreateInstance" API 102. An executable file 80 for the class is then loaded into a remote server process, and the class factory 82 in the executable file 80 is used to create an instance of the COM object 140. Finally, the "CoCreateInstance( )" API 102 function returns to the client 100 an interface pointer to an interface proxy 110 for the requested component 140. Whether a component is instantiated locally or remotely, the pointer returned to the client program refers to a location in local address space. So to a client, all component instantiations appear to be in-process.

COM: In-Process, Cross-Process, and Cross-Machine Communication

Binary compatibility gives COM components true location transparency. A client can communicate with a COM component in the same process, in a different process, or on an entirely different machine. Stated more succinctly, COM supports in-process, cross-process, or cross-machine communication. The location of the COM component is completely transparent to the client because in each case the client still invokes the component by calling indirectly through an interface's virtual function table. Location transparency is supported by two facilities: MIDL generation of interface proxies and stubs, and the system registry.

Referring again to FIG. 5, cross-machine communication occurs transparently through and interface proxy 110 and stub 130, which are generated by software such as the MIDL compiler. The proxy 110 and stub 130 include information necessary to parse and type function arguments passed between the client 100 and the component 140. For example, this information can be generated from an Interface Description Language (IDL) description of the interface of the component 140 that is accessed by the client 100. The proxy 110 and stub 130 can provide security for communication between the client 100 and the component 140. A client 100 communicates with the proxy 110 as if the proxy 110 were the instantiated component 140. The component 140 communicates with the stub 130 as if the stub 130 were the requesting client 100. The proxy 110 marshals function arguments passed from the client into one or more packets that can be transported between address spaces or between machines. Data for the function arguments is stored in a data representation understood by both the proxy 110 and the stub 130. In DCOM, the proxy 110 and stub 130 copy pointer-rich data structures using deep-copy semantics. The proxy 110 and stub 130 typically include a protocol stack and protocol information for remote communication, for example, the DCOM network protocol, which is a superset of the Open Group's Distributed Computing Environment Remote Procedure Call (DCE RPC) protocol. The one or more serialized packets are sent over the network 120 to the destination machine. The stub unmarshals the one or more packets into function arguments, and passes the arguments to the component 140. In theory, proxies and stubs come in pairs—the first for marshaling and the second for unmarshaling. In practice, COM combines code for the proxy and stub for a specific interface into a single reusable binary.

The client 100 invokes the component 140 through an indirect call on an interface virtual function table 64. In this case, however, following the interface pointer provided to the client 100, the virtual function table 64 belongs to the proxy 110. The proxy 110 marshals function argument into one or more serialized packets and sends the packets to the destination machine using DCOM Network Protocol. The stub 130 unmarshals the arguments and calls the component 140 through the interface virtual function table 64 in the target address space. As a call is returned, the process is reversed. In this way, in-process communication between client 100 and component 140 is emulated in a distributed computing environment, invisibly to both the client 100 and the component 140.

Invocation of cross-process components is very similar to invocation of cross-machine components. Moreover, cross-process communication uses the same interface proxies and stubs as cross-machine communication. The important difference is that once the function arguments have been marshaled into a buffer, DCOM transfers execution to the address space of the component. As with cross-machine invocation and communication, cross-process invocation and communication are completely transparent to both client and component.

COM insures location transparency because all communication takes place through calls on interface virtual function tables. The client does not know whether the code pointed to by the virtual function table belongs to the component or to an interface proxy that will forward the message to the remote component.

COM: Standard Interfaces

Once the client of the COM object 60 has obtained the first interface pointer of the COM object, the client can obtain pointers of other desired interfaces of the component using the interface identifier associated with the desired interface.

The "IUnknown" interface includes a member function named "QueryInterface( )." The "QueryInterface( )" function can be called with an interface identifier as an argument, and returns a pointer to the interface associated with that interface identifier. The "IUnknown" interface of each COM object also includes member functions, "AddRef( )" and "Release( )." Whenever a client of a component creates a new reference (e.g., an interface pointer) to the component, it calls "AddRef( )." When it is finished using the reference, it calls "Release( )." Through the "AddRef( )" and "Release( )" functions, a component knows exactly how many clients have references to it. When its reference count goes to zero, the component is responsible for freeing itself from memory. By convention, the "IUnknown" interface's member functions are included as part of each interface on a COM object. Thus, any interface pointer that the client obtains to an interface of a COM object can be used to call the "QueryInterface( )" function.

Com: Interface Design Considerations

By design, the COM binary standard restricts the implementation of an interface and components to the degree necessary to insure interoperability. To summarize, COM places four specific restrictions on interface design to insure component interoperability. First, a client accesses a component through its interface pointers. Second, the first item pointed to by an interface pointer must be a pointer to a virtual function table. Third, the first three entries of the virtual function table must point to the "QueryInterface( )", "AddRef( )" and "Release( )" functions for the interface. Finally, if a client intends to use an interface, it must insure that the interface's reference count has been incremented. As long as a component programmer obeys the four rules of the COM binary standard, he or she is completely free to make any other implementation choices.

During implementation, the component programmer chooses a memory layout for component and per-instance interface data. Memory layout is influenced by the number of supported interfaces, the existence of unique instances of the same interface for different clients, the expected lifetimes of interface instances, the amount of per-instance and per-component data, and internal, component-specific design factors.

Figure 6:
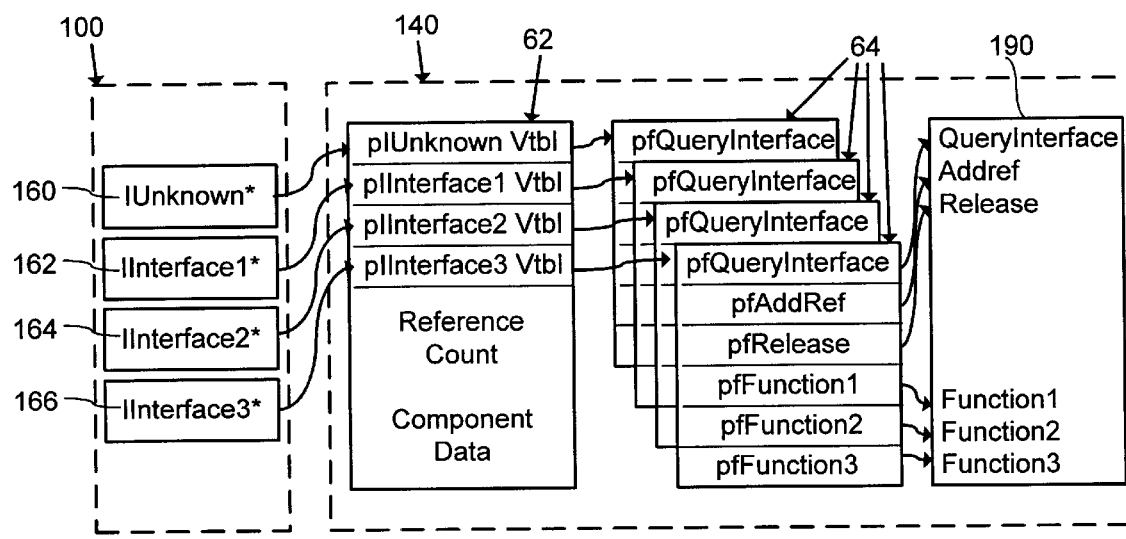
FIG. 6 is a block diagram of the component of FIG. 4 with multiple interfaces specified according to Microsoft's Component Object Model.

Most components support at most roughly a dozen interfaces with each interface having only a single instance. Referring to FIG. 6, the relationship between a client 100 and a component 140 exposing multiple interfaces to the client is explored in some detail. The client includes an interface pointer 160 to the IUnknown interface, and other interface pointers 162–166 for other interfaces exposed by the client. The interface pointers 160–166 point to an instance data structure 62 for the component 140. COM defines several standard interfaces generally supported by COM objects including the "Iunknown" interface. A pointer 170 to the virtual table 180 is listed first in the instance data structure 62 of the component 140. The instance data structure 62 contains one VTBL pointer 170–173 per interface, a per-component reference count 176, and internal component data 178. Each VTBL pointer 170–173 points to a virtual table 180–183, which in turn contain pointers to member functions 190–195 of the interfaces. Every interface includes the "QueryInterface( )" 190, "AddRef( )" 191, and "Release( )" 192 functions. In addition, interfaces can include other member functions. For example, Interface3 includes the additional functions 193–195. Within the component's member functions, a constant value is added to the "this" pointer to find the start of the memory block and to access component data 178. All of the component interfaces use a common pair of "AddRef( )" and "Release( )" functions to increment and decrement the component reference count 176.

Sometimes, a component supports multiple copies of a single interface. Multiple-instance interfaces are often used for iteration. A new instance of the interface is allocated for each client. Multiple-instance interfaces are typically implemented using a tear-off interface. A tear-off interface is allocated as a separate memory block. The tear-off interface contains the interface's VTBL pointer, a per-interface reference count, a pointer to the component's primary memory block, and any instance-specific data. In addition to multiple-instance interfaces, tear-off interfaces are often used to implement rarely accessed interfaces when component memory size is desirably minimized, (i.e., when the cost of the extra four bytes for a VTBL pointer per component instance is too expensive).

Components commonly use a technique called delegation to export interfaces from another component to a client. Delegation is often used when one component aggregates services from several other components into a single entity. The aggregating component exports its own interfaces, which delegate their implementation to the aggregated components. In the simple case, the delegating interface simply calls the aggregated interface. The simple case is interface specific, code intensive, and requires an extra procedure call during invocation. The simple solution is code intensive because delegating code is written for each interface type. The extra procedure call becomes particularly important if the member function has a large number of arguments or multiple delegators are nested through layers of aggregation.

A generalization of delegation is the use of a universal delegator. The universal delegator is essentially a type-independent, re-usable delegator. The data structure for a universal delegator consists of a VTBL pointer, a reference count, a pointer to the aggregated interface, and a pointer to the aggregating component. Upon invocation, a member function in the universal delegator replaces the "this" pointer on the argument stack with the pointer to the delegated interface and jumps directly to the entry point of the appropriate member function in the aggregated interface. The universal delegator is "universal" because its member functions need know nothing about the type of interface to which they are delegating; they reuse the invoking call frame. Implemented in a manner similar to tear-off interfaces, universal delegators are instantiated on demand, one per delegated interface with a common VTBL shared among all instances.

Alternative Object Standards and Distributed Communications Services

The COIGN system is described with reference to applications designed according to COM. The service installation functions of the Detours library, however, are applicable to applications designed according to other object standards.

Overview of the Illustrated ADPS Using the Detours Library

The COIGN system uses the Detours library to install service layers for profiling a COM application and distributing components of COM application according to a distribution scheme. Thus, it is both possible and beneficial to automatically partition and distribute applications designed to run on single machine.

In general, an ADPS takes an application as its input. For output, the ADPS modifies the application to produce a distributed version of the application that minimizes network communication costs. The COIGN system uses the Detours library to install a profiling instrumentation layer on the COM components of an application binary. The COIGN system then uses the Detours library to install a distributed execution service layer on the COM components of the application binary to produce a distributed version of the application.

An application is automatically partitioned for distribution by the illustrated ADPS. In the COIGN system, the application is an application binary, including executable files, dynamic link libraries, and other object code representations of software. In the COIGN system, the application binary is desirably designed according to an object model with suitable granularity, location transparency, and interface description, for example, Microsoft's COM, but alternatively can be designed according to other standards.

An application description set describing the behavior of the application is prepared for the application. The application description set can include static and/or dynamic metadata describing the application. For example, in the COIGN system, the application description set includes can include static metadata derived from metadata provided by a Microsoft IDL compiler (MIDL) or generated by the illustrated ADPS through static analysis techniques. Dynamic analysis techniques can be used by the illustrated ADPS to include dynamic metadata (such as dynamic descriptions of units, descriptions of actual inter-unit communication between the units of the application, and descriptions of how much time was spent in each unit in computation) in the application description set. The COIGN system uses the Detours library to install a layer of profiling instrumentation on COM components to measure inter-component communication.

An environment description set describes the distributed computing environment in which the application is to be distributed. The environment description set can be high-level or low-level, network-independent or network-dependent. The environment description set can also include descriptions of network characteristics such as latency and bandwidth, or descriptions of location constraints for particular units.

The environment description set and application description set are analyzed to determine where units of the application should be located in the distributed computing environment. For example, the COIGN system applies a commodity flow algorithm to a representation of units and communication between the units.

A distribution scheme is the result of applying the environment description set to the application description set. The distribution scheme includes a mapping of application units to locations in a distributed computing environment. The units can be classified using static or dynamic metadata of the units. At run-time, units of the application are mapped using the distribution scheme for location on an appropriate computer in the distributed computing environment. For example, the COIGN system uses the Detours library to install a layer for dynamically classifying and distributing components.

The Detours library includes functions for editing dynamic link library ["DLL"] tables of an application or system binary file, as well as functions for appending a data payload to an application or system binary file. For example, the COIGN system uses the Detours library to attach a DLL for the COIGN runtime executive to an application binary. The COIGN system also attaches a COIGN configuration data payload to the application binary. The COIGN runtime executive is the first DLL loaded into the application address space at load time.

The Detours library also includes functions for statically and dynamically allocating trampoline functions, for installing detour functions on target functions, and for removing detours from target functions. The COIGN runtime executive references these service installation functions of the Detours library to instrument components of the application binary. More specifically, the COIGN runtime executive uses the Detours library to redirect a target component instantiation function to a detour component instantiation function. The detour component instantiation function provides a service semantic such as profiling the application or distributing components in a distributed computing environment. The detour component instantiation function calls a trampoline function that provides the semantic of the original component instantiation function as appropriate.

Detours Library: Attachment to an Application Binary

The Detours library includes functions for editing DLL tables of a binary file. The Detours library includes functions for adding and removing data payloads from a binary file. These functions provide reversible support for statically linking a DLL ans associated data payload to an application binary for service installation.

Figure 7:
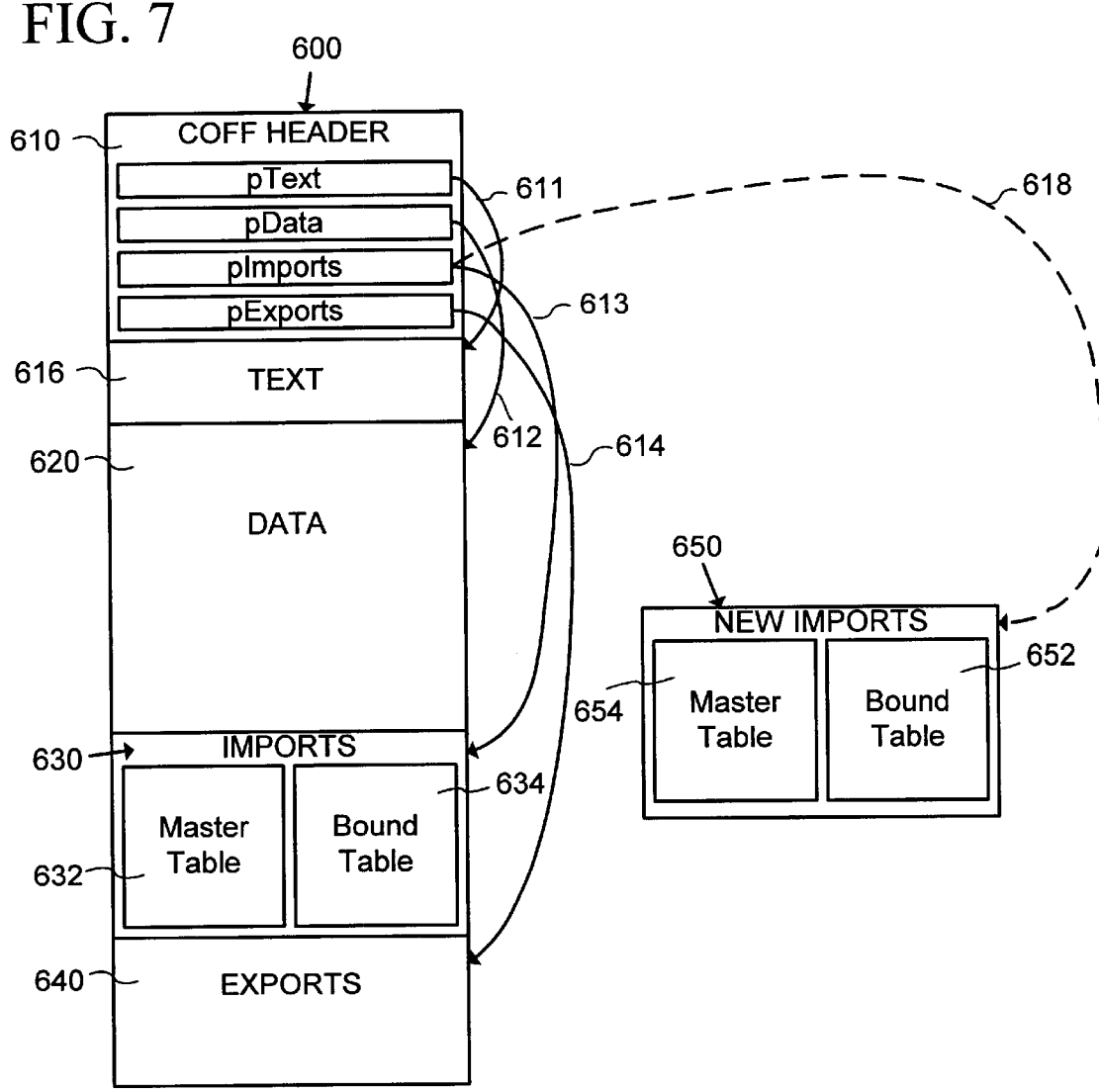
FIG. 7 is a block diagram showing an application binary in common object file format that is statically linked according to one embodiment of the present invention.

FIG. 7 shows the basic structure of a binary file 600 such an application binary in Common Object File Formet ["COFF"]. A COFF binary file 600 includes a header section 610, a text section 616, a data section 620, a list of imports 630, and a list of exports 640. The header section 610 includes pointers 611–614 to other sections of the application binary 600. The text section 616 includes program code. The data section 620 includes initialized data. Function calls to functions provided by other DLLs are represented as address offsets from the pointer 612 in the COFF header 610 to the imports section 630. The list of imports includes two parallel tables. The first table, the master table 632, contains string descriptions of other libraries and functions that must be loaded for the application to work, for example, necessary DLLs. The second table, the bound table 634, is identical to the master table before binding. After binding, the bound table contains corresponding addresses for bound functions in the application image in address space. Function calls are directly represented as offsets in the bound table. For this reason, the ordering of the bound table should not be changed during linking. The exports list 640 includes functions that the application binary 600 exports for use by other programs. With the exception of the header, the above sections are optional. A Win32 Portable Executable ["PE"] file is an extension of COFF that includes an additional header. Debug symbols can be appended at the end of a PE file.

A COFF binary file typically works with static binding. Static binding is performed in two stages. At link time, the linker embeds in the application binary the name of the DLL, a list of all imported functions, and an indirect jump table with one entry per imported function. At load time, the loader maps all imported DLLs into the application's address space and patches the indirect jump table entries to point to the correct entry points in the DLL image.

Figure 8:
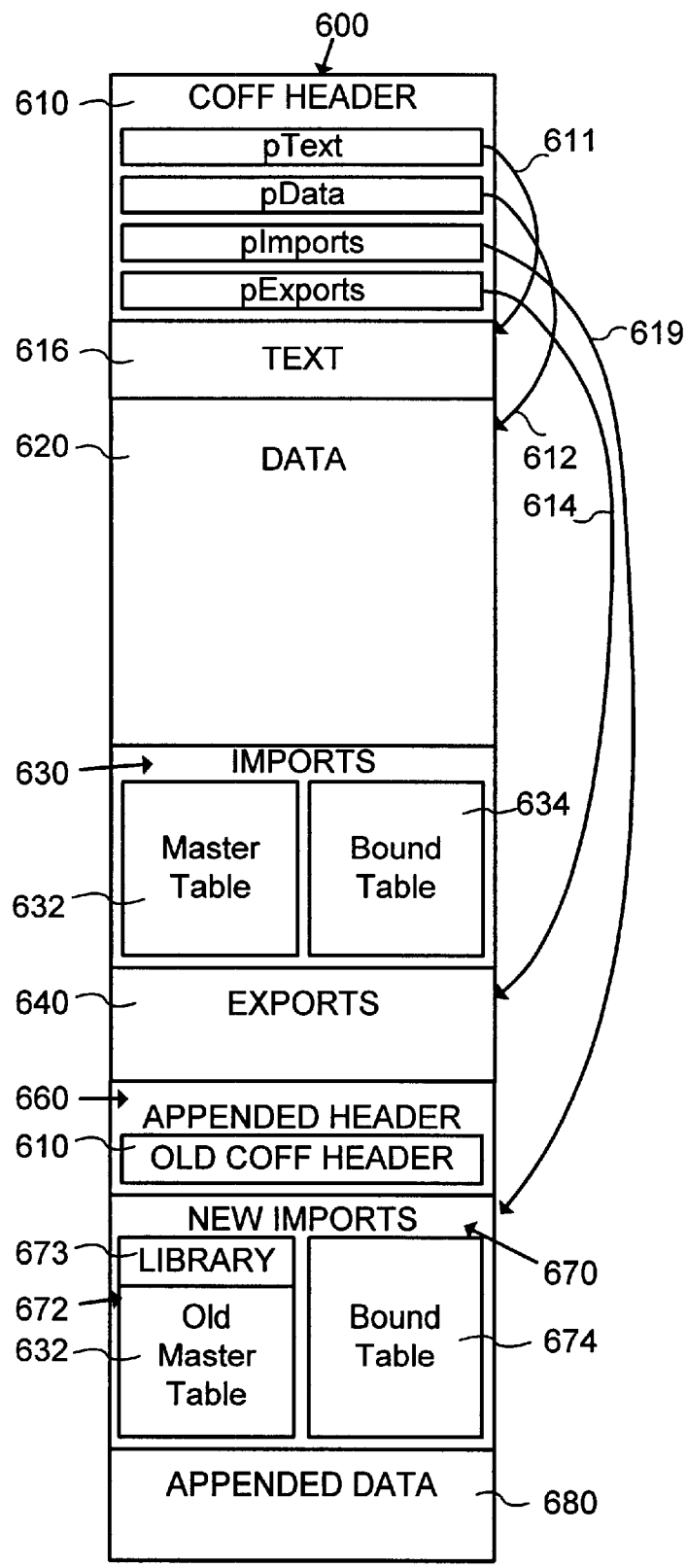
FIG. 8 is a block diagram showing the application binary of FIG. 7 reversibly static re-linked to a second set of libraries.

The Detours library includes functions for reversibly attaching DLLs and data payloads to a binary file for static binding. As shown in FIG. 8, the Detours library creates a new detours section following the export section 640 of the original binary file. The Detours library includes functions for editing import tables, adding payloads, enumerating payloads, removing payloads, and rebinding binary files. The Detours library also provides routines for enumerating the binary files mapped into an address space and locating payloads within those mapped binaries. Each payload is identified by a 128-bit GUID. Using the functions of the Detours library, the linking of a library to an application is made reversible, and static re-linking to the same application binary to a second library is flexibly enabled.

The COIGN system uses the Detours library to attach the COIGN runtime to an application binary through the "set- COIGN" utility. The COIGN system also uses the Detours library to attach per-application configuration data to an application binary. The COIGN runtime loads into application's address space before the application executes. The COIGN runtime is packaged as a collection of dynamic link libraries. The COIGN run-time executive (RTE) is the most important DLL; it loads all other COIGN DLLs, so is loaded first into the application's address space. In general, the RTE provides low-level services to the other components in the COIGN runtime. The various COIGN components perform services related to, e.g., scenario-based profiling of applications, dynamically classifying components, or distributing components according to a distribution scheme. Some COIGN components access appended data payloads for information about, e.g., interface metadata or a component distribution scheme. Other COIGN components write information to data payloads for profiling or other purposes.

FIG. 8 shows a COFF application binary 600. The imports section 630 includes master 632 and bound 634 tables. To reversibly link a library to the application binary 600, the Detours library appends a detour section to the application binary 600. For example, in COIGN, the setCOIGN utility appends the detour section. A header 660 is appended to the application binary 600. In COIGN, the appended header 660 is called a COIGN header. The original COFF header 610 is copied to the appended header for storage.

A new imports section 670 is created following the appended header, and the first entry in the master table 672 of the new imports section 670 is a reference 673 to the first library to be loaded. For example, in COIGN, the first entry 673 can be for the COIGN RTE DLL. Following the first entry 673, the original master table 632 is appended.

The binary rewriter can also append arbitrary data 680 to the extended COFF file. The arbitrary data includes any sort of user payload. For example, a COIGN configuration record can be appended to the end of the application by the setCOIGN utility. The RTE reads the configuration information written into the application binary by the setCOIGN utility. Based on information in the configuration record, the RTE loads other components of the COIGN runtime. For example, the sets of DLLs for profiling or "regular" program execution, i.e., heavyweight or lightweight instrumentation packages, which differ in the choice of components to run on top of the RTE. According to the model of the COIGN system with the Detours library, arbitrary combinations of modules, and arbitrary combinations of different versions of modules, enable tailoring of instrumentation packages for a wide range of analysis and adaptation tasks.

Alternatively, other types of data can be appended. Each unit of data in the COIGN system can include a GUID describing the type of data, an offset to the next unit of data, as well as the data itself. The COIGN configuration record can contain information used by the distributed runtime to produce a chosen distribution. The RTE with the Detours library provides a set of functions to access information in the configuration record created by setCOIGN. The RTE, in cooperation with an information logger component, provides other components with persistent storage through the configuration record.

Finally, the original COFF header 610 is modified by the binary rewriter to point 619 to the new imports section 670.

At load time, the libraries listed in the master table 672 of the new import section 670 are loaded, and addresses are loaded into the bound table 674. During execution, an application instrumented according to the added library 673 in the imports section can access and store data 680 appended to the extended COFF file. For example, in COIGN, the COIGN instrumentation can access and store data in the COIGN configuration record.

To re-link the application binary, the original COFF header 610 is restored from the appended header 660. The appended header 660, new imports section 670, and any appended data 680 are discarded. Because the original COFF header 610 contained a pointer 614 to the original imports section 630, the application binary 600 is restored. At this point, the process can repeated using the original application binary, or using a second library instead of the first library. Alternatively, the first entry 673 in the master table 672 of the new imports section 670 can be overwritten with a binary rewriter to include the second library instead of the first, and the application re-binded.

In this way, multiple instrumentation packages can be added to an application binary 600 without recompiling the application binary. Moreover, because a new imports section 670 is used, changes to the imports section 670 can be of arbitrary length and still not corrupt the application binary 600.

Because the functions in the Detours library modify code in the address space of a software system, in the COIGN system a programmer can ensure that no other threads execute the target, detour, or trampoline functions during insertion or removal of a detour. To do this, a programmer calls functions of the Detour library from a DLLMain routine to ensure single thread execution.

In addition to exporting function entry points to applications, DLLs in Windows NT also export a special entry point to the operating system, the DllMain function. The DllMain function is invoked by the operating system on initialization or termination of an application or any of its threads. DllMain gives the DLL first-chance execution on program initialization and last-chance execution on termination. One use for DllMain is to invoke static C++ constructors and destructors. When loaded into an application's address space, the DllMain function of the COIGN RTE DLL applies inline redirection to the COM API functions, as describe below.

Profiling Instrumentation Package

The COIGN system uses the Detours library to install a profiling instrumentation layer on an application binary. Through the profiling instrumentation 20 layer, the COIGN system measures inter-component communication during scenario-based profiling. The instrumentation layer uses structural metadata such as IDL metadata to identify function parameters. The instrumentation layer then measures the numbers, sizes, and endpoints of the function parameters and records the results for later analysis.

At the end of the profiling, COIGN writes a summary log of inter-component communication to a file for later analysis. In addition to information about the number and sizes of messages and components in the application, the profile log also contains information used to classify components and to determine pair-wise component location constraints. The log file can be inserted into the configuration record in the application executable using the functions of the Detours library.

Distributed Execution Package

The COIGN system uses the Detours library to install a component distributing instrumentation layer on an application binary. Through the component distributing instrumentation layer, the COIGN system classifies components and distributes them through a distributed computing environment according to the distribution scheme. After analysis of profiling data, residual profiling logs are removed from the configuration record. An application's inter-component communication model is written into the configuration record in the application binary using the setCOIGN utility. This includes data for a component classifier. The configuration record is also modified to disable the profiling instrumentation. In its place, a lightweight version of the instrumentation is loaded to realize (enforce) a distribution scheme.

The COIGN system classifies individual units of the application, and determines which units should execute locally and which should execute remotely, and dynamically creates the units at the appropriate locations. COIGN distributes components to a server by starting a surrogate using functions such as LoadLibrary and GetProcAddress APIs from Microsoft Corporation.

Detours Library: Service Installation on Target Functions

The Detours library includes functions for statically and dynamically allocating trampoline functions, installing detours on target functions, and removing detours from target functions. To use the Detours library, a user provides detour functions and indicates target functions for service installation. User code includes calls to the functions of the Detours library. The following user code fragment illustrates use of the functions of Detours library with trivial detour functions provided for the sake of illustration:

```
#include <windows.h>
#include <detours.h>
VOID (*DynamicTrampoline) (VOID) = NULL;
DETOUR_TRAMPOLINE(VOID WINAPI SleepTrampoline(DWORD), Sleep);
VOID WINAPI SleepDetour(DWORD dw)
{
        //optional instructions for providing service
        SleepTrampoline(dw);
        //optional instruction for providing service
}
VOID DynamicDetour(VOID)
{
        //optional instructions for providing service
        DynamicTrampoline( );
        //optional instructions for providing service
}
VOID main(void)
{
        VOID (*DynamicTarget) (VOID) = SomeFunction;
        DynamicTrampoline = (FUNCPTR) DetourFunction(
                (PBYTE) DynamicTarget,
                (PBYTE) DynamicDetour);
        DetourFunctionWithTrampoline(
                (PBYTE) SleepTrampoline,
                (PBYTE) SleepDetour);
        // Execute the remainder of the program.
        DetourRemoveTrampoline(SleepTrampoline);
        DetourRemoveTrampoline(DynamicTrampoline);
}
``` process on the server. The surrogate acts as a distributed extension of the application; distributed components reside in its address space. A distributed version of the COIGN runtime maintains communication links between the original application process on the client and the surrogate process on the server.

Alternative Embodiments

In alternative embodiments of the present invention, the service installation functions of the Detours library are attached to an application binary or system binary file by other techniques.

One alternative technique is modifying a binary file to include a replacement import section 650, as shown in FIG. 7, followed by static binding. Into the master table 652 of the new imports section 650, the binary rewriter inserts an entry to load a DLL, and appends the old master table 632. The header section 610 of the application points 618 to the new imports section 650 instead of the old imports section 630. At load time, the libraries listed in the new master table 650 are loaded.

Another alternative technique is DLL injection of a code fragment into the address space of an application followed by invocation of the code fragment to dynamically bind As shown in this user code fragment, user code includes the detours.h header file and links with the detours.lib library.

The user code fragment shows two trivial detour functions: SleepDetour and DynamicDetour. These detour functions are for use with statically allocated trampoline functions and dynamically allocated trampoline functions, respectively. The instructions that provide a service semantic in these detour functions are not shown. Moreover, although each of these detour functions shows a single call to a trampoline function, in general, a detour function can include multiple calls to a trampoline function. Moreover, a detour function can conditionally bypass a call to a trampoline function. For example, a detour function that tests memory allocation functions of a software system can selectively not call a trampoline function in order to test the case in which a memory allocation function fails.

The user code fragment shows techniques for allocating trampoline functions either statically or dynamically. Statically allocated trampoline functions are allocated before run time. They can be conveniently linked with statically linked target functions using a link symbol for a target function. Dynamically allocated trampoline functions are allocated at run time.

To intercept a call to a target function with a statically allocated trampoline function, the statically allocated trampoline is created with the DETOUR_TRAMPOLINE macro. DETOUR_TRAMPOLINE takes two arguments: a prototype for the statically allocated trampoline function (the name of the trampoline function) and the name of the target function. In the shown user code fragment, the prototype is called SleepTrampoline and the name of the target function is Sleep. Given these parameters, the DETOUR_MACRO creates a statically allocated trampoline function named SleepTrampoline beginning with an unconditional branch instruction to the beginning of the target function Sleep. The DETOUR_TRAMPOLINE macro provides a statically allocated trampoline function SleepTrampoline that guarantees a detour-free semantic for the target function. Calling the statically allocated trampoline function before service installation causes execution to transfer to the target function. In an alternative embodiment, instead of a macro, a statically allocated pass function is created by explicitly allocating an array of instructions for a pass function. (The macro, in effect, expands to this allocation, but makes the code easier to read.)

When a statically allocated trampoline function is used, DetourFunctionWithTrampoline installs a service on the target function. DetourFunctionWithTrampoline takes two arguments: a pointer to the statically allocated trampoline function and a pointer to the Detour function, here SleepTrampoline and SleepDetour, respectively. DetourFunctionWithTrampoline modifies Sleep to jump to SleepDetour. DetourFunctionWithTrampoline modifies SleepTrampoline to include any overwritten instructions from Sleep as well as a branch instruction to the logically subsequent instruction in Sleep. In the illustrated embodiment, the target function Sleep is not given as an argument because it is already encoded in SleepTrampoline.

In the illustrated embodiment, the prototype, target function, detour function, and trampoline function all have the same call signature, including number of arguments and calling convention. Using the same calling convention insures that registers are properly preserved and that the call stack is properly aligned between detour and target functions. This facilitates the task of maintaining state consistency despite installation of an arbitrary service layer.

Statically allocated trampolines are useful when the target function is available as a link symbol. Calling a statically allocated trampoline function provides a service-free semantic for a target function before or after installation is installed. Thus, to always bypass a detour function, a call is made to a statically allocated pass function. When the target function is not available as a link symbol, a dynamically allocated trampoline function can be used.

For service installation and creation of a dynamically allocated trampoline function, the Detours library includes DetourFunction. DetourFunction takes two arguments: a pointer to the target function and a pointer to the detour function. In the shown user code fragment, these are DynamicTarget and DynamicDetour, respectively. DetourFunction returns a pointer to a dynamically allocated trampoline function DynamicTrampoline, which was initialized at the beginning of the user code fragment. DetourFunction modifies DynamicTarget to jump to DynamicDetour. DetourFunction makes DynamicTrampoline include any overwritten instructions from DynamicTarget as well as an unconditional branch instruction to the logically subsequent instruction in DynamicTarget.

Often, a pointer to the target function can be acquired from another function. For those times when a pointer to a target function is not readily available, the Detours library includes the function DetourFindFunction. DetourFindFunction finds a pointer to a target function when the target function is exported from a known DLL or if debugging symbols are available for the target function's DLL. DetourFindFunction accepts two arguments: the name of the DLL and the name of the function. DetourFindFunction returns either a valid pointer to the target function or a null pointer if the symbol for the function cannot be found. DetourFindFunction attempts to locate the target function using the Win32 LoadLibrary and GetProcAddress APIs. If the target function is not found in the export table of the DLL, DetourFindFunction uses the ImageHLP library to search available debugging symbols. The function pointer returned by DetourFindFunction can be used to create a dynamically allocated trampoline function with DetourFunction.

For service removal, the Detours library includes DetourRemoveTrampoline. DetourRemoveTrampoline accepts one argument: the trampoline function. Versions exist for statically allocated trampoline functions and dynamically allocated trampoline functions. DetourRemoveTrampoline replaces the unconditional branch instruction in the base function with the original first one or more instructions of the base function. DetourRemoveTrampoline makes the trampoline function conform to the restored base function. In the trampoline function, the first instruction becomes an unconditional branch to the first instruction in the base function. Thus, after service removal, the trampoline function still provides a detour-free target function semantic.

Alternative Embodiments

Although the functions of the Detours library shown in the above user code fragment accept defined parameters, in alternative embodiments of the present invention, functions for trampoline creation, service installation, trampoline modification, and service removal according to the present invention take other parameters to accomplish the same functions. Moreover, different configurations of functions can provide the same result of a service-installed base function, a service function, and a pass function with service-free base function semantic.

The COIGN System

The COIGN system uses the Detours library to instrument component instantiation functions for COM components. The COIGN RTE loads in application address space before other DLLs. The COIGN RTE takes advantage of this opportunity to insert binary instrumentation into the image of system libraries in the application's address space. The COIGN RTE patches the COM library and other system services to intercept component instantiation requests and re-direct them. Before returning control to the application, the COIGN RTE loads any additional COIGN components as stipulated by the configuration information stored in the application.

Applications instantiate COM components by calling API functions exported from a user-mode COM DLL. Applications bind to the COM DLL either statically or dynamically. The COM DLL exports approximately 50 unit activation functions, functions capable of instantiating new components. With few exceptions, applications instantiate components exclusively through the CoCreateInstance function or its successor, CoCreateInstanceEx. From the instrumentation perspective there is little difference among the COM API functions. For brevity, CoCreateInstance is a placeholder for any function that instantiates new COM components.

A component instantiation function returns a reference to an interface of the instantiated component to the client component that called the function. To profile an application, the COIGN instrumentation wraps the interface with an interface wrapper before returning it to the client component. Subsequent calls to functions on interfaces exposed by the component are intercepted by the interface wrapper. Thus, a layer of profiling instrumentation is inserted to measure parameters of function calls.

To distribute components in a distributed computing environment, component instantiation calls are intercepted by the COIGN runtime. In the COIGN system, the detour function executes instructions for classifying a unit to be created and determining a location in a distributed computing environment for the unit to be created. If the unit is to be activated locally, the instrumentation detour function calls the trampoline function to activate the unit locally. In the trampoline function, the first instructions of the original target function execute, then control passes to the modified target function for execution of the remaining instructions. If unit is to be activated remotely, the function call is routed to the appropriate remote location.

Manipulating Instructions in Function Images

Figure 9:
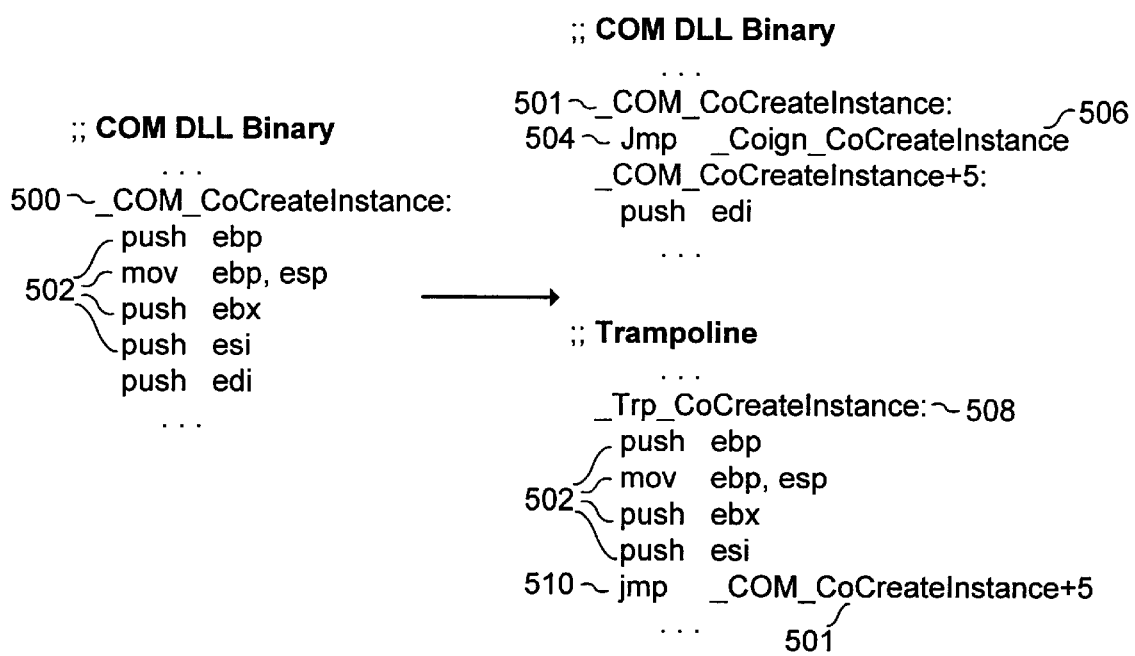
FIG. 9 is a listing containing code fragments illustrating interception and in-line redirection of communications according to the COIGN system using one embodiment of the present invention, the Detours library.

Instructions for a function form a function image when loaded into computer memory. The COIGN system uses the Detours library to manipulate instructions in function images. FIG. 9 shows a code fragment in which the Detours library manipulates a function image for a COM binary function to install a service. In FIG. 9, the target function is COM_CoCreateInstance, the detour function is COIGN_CoCreateInstance, and the trampoline function is Trp_CoCreateInstance.

Referring to FIG. 9, the Detours library allocates memory for the trampoline function (if needed) and enables write access to both the target function and the trampoline function. The first one or more instructions 502 of the target function 500 are copied to a trampoline function 508. To copy instructions, the Detours library uses a simple table-driven processor-instruction disassembler, the design of which is known in the art. Enough instructions are copied to fit an unconditional branch, or jump, instruction. The copied instructions in the trampoline function 508 are followed by a jump instruction 510 to the first non-copied instruction of the target function. In the target function, the first one or more instructions are replaced with a jump instruction 504 to the detour function 506 in the instrumentation. The first one or more instructions 502 are normally part of the function prolog generated by a compiler and not the targets of any branches. To finish, the Detours library restores the original page permissions on the target and trampoline functions and flushes the CPU instruction cache with a call to FlushInstructionCache.

In the COIGN system, when the instructions 502 of the target function 500 come from a variable length instruction set, the COIGN instrumentation determines the size of the jump instruction 504 to the instrumentation detour function 506. Any instructions 502 that will be overwritten by the jump instruction 504 are copied to the trampoline function 508. The jump instruction 510 from the trampoline function 508 to the modified target function 501 transfers control to a spot following in execution the last copied instruction of the target function 500.

Alternatively, when the instructions of the target function 500 come from a fixed length instruction set, the first instruction of the trampoline function 508 is the first instruction of the target function 500. The jump 510 in the trampoline function 508 transfers control to the second instruction in the modified target function 501, whose first instruction is a jump instruction 504 to the detour function 506.

When the modified target function 501 is invoked, the jump instruction 504 transfers execution to the detour function 506 in the instrumentation. The detour function, here COIGN_CoCreateInstance, performs some service such as profiling or redirection. In general, the detour function can provide any service semantic. The detour function 506 passes control to the remainder of the target function by invoking the trampoline function 508. After the moved instructions 502 are executed in the trampoline 508, a jump instruction 510 transfers execution back to a spot in the modified target function 501. The trampoline function 508 allows invocation of the modified target function 501 without interception by the detour function 506.

One aspect of the present invention concerns use of a uniform calling convention and system-provided call stack to maintain state consistency for a service installed on a base function. A function call transfers execution to a function while saving the necessary information to allow execution to resume at the calling point when the function has completed execution. A call to a function includes parameters that are part of a call frame pushed on a call stack. A stack pointer is a register value that indicates the address of the top element of the call stack. Registers may hold some of the parameters for a call frame at the top of a call stack while memory holds other parameters. On entering and returning from a function, the state of the processor (including registers values and stack pointer) must be consistent. Service installation should not disrupt state consistency, e.g., if it performs processing using the same registers.

The Detours library enables an installed service to exploit a uniform calling convention and system-provided call stack management to maintain state consistency. In this way, a service uses the standard, uniform calling convention to maintain state consistency without the need for complex register-usage analysis common to existing binary rewriters. A trampoline function, a target function, and a detour function have the same call signature. These functions accept the same number and type of parameters and operate according to the same calling convention. Calls to trampoline or target function push consistent call frames. Returns from target or detour function pop consistent call frames. A detour function can preserve the parameters of the original target function call then pass them to the trampoline function. Thus, for a target function, a call from the detour function (via trampoline function) works the same as a regular call. A return from the target function restores state and transfers execution to the detour function. A return from the detour function transfers execution and restores state to the caller of the target function. As long as the functions have the same call signature, the state consistency management system works with callee-popped or caller popped call stacks. Thus, the details of a particular calling convention are abstracted away and state consistency management is simplified.

With reference to FIG. 9, in the COIGN system, COM_CoCreateInstance, COIGN_CoCreateInstance, and Trp_CoCreateInstance have the same call signature. A call to COM_CoCreateInstance pushes a call frame on the call stack. COM_CoCreateInstance transfers execution to COIGN_CoCreateInstance without pushing a new call frame. At this stage, COIGN_CoCreateInstance can perform a service operation. COIGN_CoCreateInstance then calls a Trp_CoCreateInstance, pushing a new call frame on the call stack. Trp_CoCreateInstance transfers execution to the COM_CoCreateInstance instruction that follows the jump to the COIGN_CoCreateInstance. When COM_CoCreateInstance completes execution, the call frame from the Trp_CoCreateInstance call pops from the call stack. Later, when COIGN_CoCreateInstance completes execution, the call frame from the original COM_CoCreateInstance call pops from the call stack.

Although service installation using the Detours library to provide inline redirection is complicated somewhat by the variable-length instruction set of certain processors upon which the COIGN system runs, for example, the Intel x86 architecture, its low run-time cost and versatility more than offset the development penalty. Use of the Detours library to provide inline redirection of the CoCreateInstance function, for example, creates overhead that is more than an order of magnitude smaller than the penalty for breakpoint trapping. Moreover, unlike DLL redirection, inline redirection correctly intercepts both statically and dynamically bound invocations. Finally, using the Detours library to install services by inline redirection is much more flexible than DLL redirection or application code modification. Service installation on any API function can be selectively enabled for each process individually at load time based on the needs of the instrumentation.

Alternative Applications for Service Installation

The COIGN system uses the Detours library to install profiling instrumentation and component distributing instrumentation on an application binary. The COIGN system itself can be used during the application development process to give feedback about application performance. A developer can then modify source code or include configuration records for distributed execution in different environments. Alternatively, the COIGN system can be used by an application user to distribute an application over a particular distributed computing environment. Alternatively, the COIGN system can monitor distributed applications to ensure they remain within developer or user-defined performance constraints.

More generally, the various aspects of service installation according to the present invention are applicable to instrumentation, redirection, or extension of any software system. Specific alternative implementations of service installation according to the present invention include timing tests on software components, redirection services for legacy support of software, exception handling, and a test harness for a software system.

The service installation system of the present invention can be used to measure execution time of components in a software system. For example, the service installation system of the present invention has been used to instrument the user-mode portion of a DCOM protocol stack including marshaling proxies, DCOM runtime, RPC runtime, Win-Sock runtime, and marshaling stubs. The resultant detailed analysis was used to plan a re-architecture of the DCOM protocol stack. Binary instrumentation of the DCOM protocol stack using the service installation system of the present invention simplifies the instrumentation on a build of the DCOM software for any particular machine. Further, binary instrumentation using the the service installation system of the present invention is flexible and only affects the process being profiled.

In an extension exercise, the service installation system of the present invention was used to create a thunking layer for the Component-based Operating System Proxy ["COP"]. COP is a COM-based version of the Win32 API. COP-aware applications access operating system functionality through COM interfaces, such as IWin32FileHandle. Because the COP interfaces are distributable with DCOM, a COP application can use OS resources, including file systems, keyboards, mice, displays, registries, etc. from any machine in a network. To provide support for legacy applications, COP uses the service installation system of the present invention to intercept all application calls to the Win32 APIs. Native application API calls are converted to calls on COP interfaces. At the bottom, COP implementation communicates with the underlying operating system through pass functions. Through its interception and binary manipulation functions, the service installation system of the present invention has facilitated this massive extension of the Win32 API.

To support a Software Distributed Shared Memory ["SDSM"] system, the service installation system of the present invention has implemented a first chance exception filter for Win32 exception handling. The Win32 API contains an API, SetUnhandleExceptionFilter through which an application can specify a last-chance exception filter to execute should no other filter handle an application exception. For applications such as SDSM systems, however, a programmer may like to install a first-chance exception filter to remove page faults caused by the SDSM's manipulation of VM page permissions. Windows NT does not provide such a first-chance exception filter mechanism. The service installation system of the present invention can include a simple service function to detour the exception entry point from kernel mode to user mode. This service function calls a user-provided first-chance exception filter and then forwards the exception, if unhandled, to the default exception mechanism through a trampoline.

To test the way a software system responds to error messages, the service installation system of the present invention can act as a test harness for the software system. Function calls often return a value (e.g., HRESULT) that indicates the success or failure of the operation performed by the function, or some other event. A software system should include logic for checking return values and gracefully handling events such as function failures. Nevertheless, at times this return value checking/event handling logic is inadvertently omitted or not fully tested, which compromises software reliability. The service installation system of the present invention can be used to reroute base function calls to an event testing service function. The event testing service function deterministically or statistically skips the call the corresponding pass function for some of the base function calls. Instead, the event testing service function returns a value to simulate a function failure or some other event. In this way, the logic for handling failures or other events is explicitly tested, and the software system is made more robust and reliable. For example, the service installation system of the present system could be used to instrument memory allocation functions. Selectively calling the pass function for some memory allocation function calls, but not for others, tests the reliability and robustness of the memory allocation scheme.

Having described and illustrated the principles of our invention with reference to an illustrated embodiment, it will be recognized that the illustrated embodiment can be modified in arrangement and detail without departing from such principles. For example, the configuration of functions and the parameters of functions for service library attachment and service installation can be varied in arrangement and detail without departing from the principles of the present invention. Moreover, the COIGN system using the Detours library is just one embodiment of the present invention. Other embodiments include DCOM instrumentation, a Win32 thunking layer, a SDSM exception filter, and a test harness system. Service installation according to the present invention is more broadly applicable to instrumentation, redirection, replacement, and extension of software systems. Furthermore, service installation can be applied to any functions in the software system, including application and library functions, not just functions provided as part of the operating system.

It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto

I claim:

1. A computer readable medium storing data representing a service installation system for modifying a base function to introduce therein additional processing implemented in a service function, the service installation system comprising:

a construct function comprising instructions for creating a pass function, wherein the pass function comprises an unconditional branch instruction to the base function; and an install function comprising instructions for replacing the first one or more instructions of the base function with an unconditional branch instruction to the service function, the install function further comprising instructions for making pass function instructions include the replaced first one or more instructions followed by an unconditional branch instruction to the instruction in the base function that follows the unconditional branch instruction in the base function.

2. The computer readable medium of claim 1 wherein a binary rewriter performs replacing.

3. The computer readable medium of claim 1 wherein making comprises:

before replacing, enumerating the first one or more instructions of the base function;

copying the first one or more instructions of the base function to the beginning of the pass function; and writing the unconditional branch instruction in the pass function to the instruction in the base function that follows the last copied instruction.

4. The computer readable medium of claim 1 wherein the instructions are fixed length instructions.

5. The computer readable medium of claim 1 wherein the instructions are variable length instructions.

6. The computer readable medium of claim 1 wherein the construct function is a macro, and wherein the pass function is statically allocated.

7. The computer readable medium of claim 1 wherein the service function conditionally bypasses the pass function.

8. The computer readable medium of claim 1 wherein a single function supplies the semantics of the construct function and install function.

9. The computer readable medium of claim 1 wherein the construct function takes as parameters a pass function prototype and the name of the base function.

10. The computer readable medium of claim 1 wherein the install function takes as parameters a reference to the pass function and a reference to the service function.

11. The computer readable medium of claim 1 wherein the install function takes as parameters a reference to the base function and a reference to the service function, and wherein the install function returns a reference to a dynamically-allocated pass function.

12. A method for installing a software library that includes the construct function and install function of claim 1, the method comprising:

modifying an application binary to include a service installation section, wherein the service installation section comprises an import table, and wherein the import table lists the software library that includes the construct function and the install function, and wherein the import table further lists one or more software libraries for the application binary; and linking the modified application binary with the software libraries listed in the import table.

13. The computer readable medium of claim 1 further comprising:

an editing function comprising instructions for modifying an import table of a service installation section in an application binary that includes a service installation section.

14. The computer readable medium of claim 1 further comprising:

a pointer locating function comprising instructions for finding a pointer that references a base function.

15. The computer readable medium of claim 1 further comprising:

a payload adding function comprising instructions for adding a payload to a service installation section in an application binary that includes a service installation section, wherein a payload comprises configuration data for access by a service function; and a payload removing function comprising instructions for removing a payload from a service installation section in an application binary that includes a service installation section.

16. The computer readable medium of claim 1 further comprising:

a remove service function comprising instructions for restoring the base function, wherein the remove service function further comprises instructions for conforming the pass function to the restored base function.

17. A computer readable memory device storing data representing plural function images, where a function image comprises one or more instructions for a function in memory, the plural function images including:

a base function image comprising plural instructions;

a pass function image comprising one or more instructions, wherein the one or more instructions of the pass function image provide a service-free semantic for the base function with an unconditional branch instruction to an instruction in the base function image; and a service function image comprising one or more instructions, wherein the service function image includes at least one call to the pass function.

18. The computer readable memory device of claim 17 wherein the instructions are fixed length instructions.

19. The computer readable memory device of claim 17 wherein the instructions are variable length instructions.

20. The computer readable memory device of claim 17 wherein the service function image includes instructions for conditionally bypassing the call to the pass function.

21. The computer readable memory device of claim 17 wherein an unconditional branch instruction to the service function image replaces the first one or more instructions in the base function image, and wherein the pass function image comprises the replaced first one or more instructions and an unconditional branch instruction to the instruction in the base function image that follows the unconditional branch instruction to the service function image.

22. The computer readable memory device of claim 17 wherein a software object exposes an interface that includes the base function.

23. The computer readable memory device of claim 17 wherein the pass function image is statically allocated before run time.

24. The computer readable memory device of claim 17 wherein the pass function image is dynamically allocated during run time.

25. The computer readable memory device of claim 17 wherein the service function image comprises instructions for measuring parameters of calls to the base function.

26. The computer readable memory device of claim 17 wherein the service function image comprises instructions for calling a replacement function.

27. The computer readable memory device of claim 17 wherein the service function image comprises instructions for timing execution of the base function.

28. The computer readable memory device of claim 17 wherein the service function image comprises instructions for redirecting exceptions.

29. The computer readable memory device of claim 17 wherein the service function comprises instructions for executing before and/or after a call to the pass function.

30. The computer readable memory device of claim 17 wherein the pass function is callable from a user module.

31. A method for using a link symbol for a base function to create a statically allocated pass function, wherein the statically allocated pass function provides a service-free base function semantic, the method comprising:
    providing a pass function prototype;
    providing a base function comprising one or more instructions, wherein the one or more instructions provide a base function semantic; and
    creating a statically allocated pass function comprising one or more instructions, wherein the statically allocated pass function includes an unconditional branch instruction to an instruction in the base function.

32. A computer readable medium storing instructions for performing the method of claim 31.

33. The method of claim 31 wherein a macro performs the creating, and wherein the macro takes as parameters the name of the pass function and the name of the base function.

34. The method of claim 31 further comprising:
    providing a service function comprising one or more instructions, wherein the service function includes at least one call to the statically allocated pass function.

35. The method of claim 34 wherein the service function conditionally bypasses a call to the statically allocated pass function.

36. The method of claim 34 further comprising:
    modifying the base function to unconditionally branch to the service function; and
    conforming the pass function to the modified base function.

37. The method of claim 36 wherein modifying and conforming occur by calling an install function.

38. The method of claim 36 further comprising, before and/or after conforming, calling the pass function from a user module.

39. The method of claim 36 wherein conforming comprises
    copying the first one or more instructions of the unmodified base function to the beginning of the pass function; and
    writing an unconditional branch instruction in the pass function to the instruction in the base function that follows the last copied instruction.

40. The method of claim 36 wherein modifying and conforming occur by calling an install function.

41. The method of claim 36 further comprising, before and/or after conforming, calling the pass function from a user module.

42. The method of claim 31 further comprising:
    calling a remove service function comprising instructions for restoring the base function, wherein the remove service function further comprises instructions for conforming the pass function to the restored base function.

43. A method for creating a dynamically allocated pass function while installing a service in a base function, wherein the dynamically allocated pass function provides a service-free base function semantic, the method comprising:
    providing a base function comprising one or more instructions, wherein the one or more instructions provide a base function semantic;
    providing a service function comprising one or more instructions; and
    calling an install function to replace the first one or more instructions of the base function with an unconditional branch instruction to the service function, wherein the install function also creates a dynamically allocated pass function comprising one or more instructions that provide a service-free base function semantic.

44. A computer readable medium storing instructions for performing the method of claim 43.

45. The method of claim 43 wherein the install function takes as parameters a reference to the base function and a reference to the service function, and wherein the install function returns a reference to the dynamically allocated pass function.

46. The method of claim 43 wherein providing comprises:
    finding a pointer that references the base function using a pointer locating function.

47. The method of claim 43 further comprising:
    calling a remove service function comprising instructions for restoring the base function, wherein the remove service function further comprises instructions for conforming the pass function to the restored base function.

48. A method for using a standard calling convention to maintain state consistency for a service system, wherein calling triggers a state change by pushing a call frame on the call stack, wherein branching transfers execution without a call stack change, and wherein a base function, pass function, and service function have the same call signature, the method comprising:
    from a start function, calling a base function;
    within the base function, unconditionally branching to a service function, wherein the service function comprises one or more instructions;
    within the service function, calling a pass function;
    within the pass function, unconditionally branching to the base function instruction that follows the unconditional branch to the service function; and
    upon completion of the base function, returning to the service function, wherein the service function executes instructions before and/or after calling the pass function.

49. A computer readable medium storing instructions for performing the method of claim 48.

50. The method of claim 48 further comprising, upon completion of the service function, returning to the start function.

51. The method of claim 48 wherein calling a base function comprises passing at least one parameter to the base function, and wherein calling a pass function comprises passing the at least one parameter to the pass function.

52. The method of claim 48 wherein the call stack is callee-popped by convention.

53. The method of claim 48 wherein the call stack is caller-popped by convention.

54. A method for calling a pass function as a sub-routine in a service function to provide a service-free base function semantic, the method comprising:

modifying a base function to unconditionally branch to a service function;

calling the base function, whereby execution branches to the service function;

within the service function, calling at least one time the pass function to provide the service-free semantic for the base function before and/or after executing other instructions in the service function.

55. A computer readable medium storing instructions for performing the method of claim 54.

56. The method of claim 54 further comprising:

within a user module, calling at least one time the pass function to provide the service-free semantic for the base function before and/or after modifying.

57. The method of claim 54 further comprising:

within the service function, conditionally bypassing the call to the pass function.

* * * * *

UNITED STATES PATENT AND TRADEMARK OFFICE
CERTIFICATE OF CORRECTION

PATENT NO. : 6,546,553 B1 Page 1 of 1
DATED : April 8, 2003
INVENTOR(S) : Galen C. Hunt It is certified that error appears in the above-identified patent and that said Letters Patent is hereby corrected as shown below:

<u>Column 33,</u>
Line 14, "sub-routin e" should be -- sub-routine. --

Signed and Sealed this

Seventh Day of September, 2004

JON W. DUDAS
*Director of the United States Patent and Trademark Office*